(12) United States Patent
Betensky et al.

(10) Patent No.: US 6,373,640 B1
(45) Date of Patent: Apr. 16, 2002

(54) OPTICAL SYSTEMS FOR DIGITAL CAMERAS

(75) Inventors: Ellis I. Betensky, Toronto (CA); Alex Raschke; Klaus G. Raschke, both of Weston, FL (US)

(73) Assignee: Concord Camera Corp., Hollywood, FL (US)

(*) Notice: Subject to any disclaimer, the term of this patent is extended or adjusted under 35 U.S.C. 154(b) by 0 days.

(21) Appl. No.: 09/494,320

(22) Filed: Jan. 28, 2000

(51) Int. Cl.[7] .............................................. G02B 15/14
(52) U.S. Cl. ..................... 359/689; 359/682; 359/691; 359/708; 359/733
(58) Field of Search ...................... 359/708, 713–716, 359/676, 680–683, 685–691, 749–756, 726, 733–735; 396/379, 382–383

(56) References Cited

U.S. PATENT DOCUMENTS

| | | | |
|---|---|---|---|
| 4,469,412 A | 9/1984 | Tajima et al. ............... | 359/681 |
| 4,560,253 A | 12/1985 | Ogino ......................... | 359/682 |
| 4,949,117 A | * 8/1990 | Van Heyningen et al. .. | 396/100 |
| 5,054,897 A | 10/1991 | Ozawa ........................ | 359/680 |
| 5,446,592 A | * 8/1995 | Kohno et al. ............... | 359/689 |
| 5,523,885 A | 6/1996 | Aoki ........................... | 359/654 |
| 5,970,266 A | 10/1999 | Takato ........................ | 396/379 |
| 6,035,145 A | 3/2000 | Kanai .......................... | 396/379 |
| 6,101,044 A | * 8/2000 | Ori et al. .................... | 359/691 |

FOREIGN PATENT DOCUMENTS

| | | |
|---|---|---|
| JP | 7-225338 | 8/1995 |
| WO | WO 99/63379 | 12/1999 |

OTHER PUBLICATIONS

U.S. application No. 09/493,355, filed Jan. 28, 2000, Bittner et al.

Betensky, Ellis, "Aberration correction and desensitization of an inverse triplet objective lens," in International Optical Design Conference 1998, Proceedings of SPIE vol. 3482, 264–268, 1998.

* cited by examiner

Primary Examiner—Jordan M. Schwartz
(74) Attorney, Agent, or Firm—Maurice M. Klee

(57) ABSTRACT

Optical systems for use in digital cameras are provided. The systems can be switched between three optical paths (1,2,3): a first path (1) for through-the-lens (TTL) viewing; a second path (2) for recalling previously taken pictures from a microdisplay (16); and a third path (3) in which pictures are taken using an electronic sensor (15), e.g., a CMOS sensor. The optical systems employ a zoom objective lens unit (10), e.g., a 3:1 zoom, an erector lens unit (12), and an eye lens unit (13). They can also employ an image size adjusting lens unit (11) for equalizing the TTL and recalled images presented to the user. To facilitate integration with the electronic components of a digital camera and to provide a "book" format for the camera, the first and second optical paths (1,2) lie in a single plane and each includes two folding mirrors (17,20 for the first path; 18,20 for the second path) and the third optical path (3) has a single folding mirror (19) so that a portion of that path is in the single plane and a portion is orthogonal to that plane.

73 Claims, 11 Drawing Sheets

OPTICAL SYSTEMS FOR DIGITAL CAMERAS

FIELD OF THE INVENTION

This invention relates to optical systems for digital cameras and, in particular, to optical systems which permit through-the-lens (TTL) viewing of a scene to be digitally recorded (photographed).

BACKGROUND OF THE INVENTION

There exists a need in the art for digital cameras having some and preferably all of the following properties:
(1) The camera is a TTL camera so that parallax problems are avoided, thus making the scene viewed by the user and the scene recorded by the camera as close to identical as possible.
(2) During picture composition (picture framing), the camera is completely optical as opposed to being a combination of an optical system and an electronic display, e.g., an LCD display. In this way, the amount of electrical current used by the camera is minimized and thus battery life is maximized. As known in the art, achieving long battery life is one of the key problems in designing a successful digital camera.
(3) The camera has a recall mode (also known as a review mode) so that the user can view previously recorded images in real time.
(4) The recall mode uses an electronic display (display unit or microdisplay) to reduce camera size and conserve battery power, but still creates a large recalled image for viewing by the user, i.e., an image which subtends a large angle at the user's eye. A large recalled image is important since it allows the user to perform recall without the need for, for example, reading glasses.
(5) The camera has a single eyepiece which is used in both the TTL and recall modes. In this way, the user can perform recall without taking his or her eye away from the position used to view the scene to be photographed.
(6) The camera is a zoom camera with a focal length range of preferably at least 2:1 and most preferably at least 3:1.
(7) The camera is ergonomic and is of relatively small size both during use and storage.
(8) Although being small in overall size, the camera has a large zoom space thus allowing the use of a negative-positive (NP) relaxed zoom objective lens.
(9) The camera has a mechanical construction which is compatible with production of high quality images. In the past, many digital cameras have employed the classical layout of film cameras, namely, a layout in which the optical axis of the camera is parallel to the camera's shortest dimension. To provide for compact storage, such digital cameras have had collapsible optics, i.e., a lens barrel which was extended from the camera during picture taking and folded back into the camera during storage. For zoom lenses, it is difficult to maintain good optical performance with collapsible optics since the collapsing action compromises concentricity and accurate positioning of the optical elements making up the lens.
(10) To reduce manufacturing costs, the camera's optical system employs relatively few optical elements and is designed to have a low sensitivity to manufacturing variations (tolerances).

SUMMARY OF THE INVENTION

In view of the foregoing, it is an object of the invention to provide digital cameras which have some and preferably all of the above features. It is also an object of the invention to achieve the foregoing object through optical systems that are suitable for integration with a digital camera's electronic components in an overall small package.

To achieve the foregoing and other objects, the invention in accordance with a first aspect provides an optical system which can be switched between a first optical path (1) and a second optical path (2), said system comprising:
(A) an objective lens unit (10) having a positive optical power;
(B) an erector lens unit (12) having a positive optical power;
(C) an eye lens unit (13) having a positive optical power;
(D) a display unit (16); and
(E) optical means (17,18) for switching the optical system between said the first (1) and second (2) optical paths;
wherein:
(i) the first optical path (1) comprises, in order, the objective lens unit (10), the erector lens unit (12), and the eye lens unit (13); and
(ii) the second optical path comprises, in order, the display unit (16) and the eye lens unit (13).

In accordance with a second aspect, the invention provides an optical system which can be switched between a first optical path (1), a second optical path (2), and a third optical path (3), said system comprising:
(A) an objective lens unit (10) having a positive optical power;
(B) an erector lens unit (12) having a positive optical power;
(C) an eye lens unit (13) having a positive optical power;
(D) a sensor unit (15);
(E) a display unit (16); and
(F) optical means (17,18) for switching the optical system between said first (1), second (2), and third (3) optical paths;
wherein:
(i) the first optical path (1) comprises, in order, the objective lens unit (10), the erector lens unit (12), and the eye lens unit (13);
(ii) the second optical path (2) comprises, in order, the display unit (16) and the eye lens unit (13); and
(iii) the third optical path (3) comprises, in order, the objective lens unit (10) and the sensor unit (15).

In certain preferred embodiments of the foregoing two aspects of the invention, the second optical path (2) comprises the erector lens unit (12) between the display unit (16) and the eye lens unit (13). The use of this unit in the second optical path, however, is not required since the eye lens unit (13) and the display unit (16) can be designed to operate without an erector lens unit, e.g., the display unit can display a reverted and inverted image and the magnification of the eye lens unit and/or the size of the display unit can be chosen so that the image of the display unit produced by the eye lens unit subtends a sufficiently large angle at the user's eye for ready viewing of recalled pictures.

In other preferred embodiments of the foregoing two aspects of the invention, the system further comprises an image size adjusting lens unit (11) located in the first optical path (1) between the objective lens unit (10) and the erector lens unit (12).

In still further preferred embodiments of the foregoing two aspects of the invention, the optical system has an optical axis (1,2) which lies in a single plane for the first optical path (1) and the second optical path (2).

In certain preferred embodiments of the second aspect of the invention, a sensor lens unit (14) is located in the third optical path (3) between the objection lens unit (10) and the sensor unit (15) and serves to reduce the sensitivity of the system to manufacturing variations.

In accordance with a third aspect, the invention provides an optical system comprising:

(A) a zoom objective lens unit (10) which has a long conjugate and a short conjugate and, in order from said long conjugate to said short conjugate, comprises:

(i) a first lens unit ($U_1$) having a focal length fi, said first lens unit comprising two lens elements, each of which has two aspherical surfaces;

(ii) a second lens unit ($U_2$) that moves to effect a change in the optical power of the zoom objective lens unit, said second lens unit having a focal length $f_2$ and comprising two lens elements, each of which has two aspherical surfaces; and (iii) a sensor lens unit (14); and (B) a sensor unit (15) adjacent to the sensor lens unit (14).

In accordance with a fourth aspect, the invention provides a zoom lens (10) which has a long conjugate and a short conjugate and, in order from said long conjugate to said short conjugate, comprises:

(a) a first lens unit ($U_1$) having a focal length $f_1$, said first lens unit comprising two lens elements, each of which has two aspherical surfaces; and (b) a second lens unit ($U_2$) that moves to effect a change in the optical power of the zoom lens, said second lens unit having a focal length $f_2$ and comprising two lens elements, each of which has two aspherical surfaces; wherein:

$f_1 < 0$, $f_2 > 0$, and $|f_1|/f_2 < 1$.

In certain preferred embodiments of the third and fourth aspects of the invention, the zoom objective lens unit or zoom lens has:

(a) a wide angle focal length $f_{MIN}$; and (b) an exit pupil distance $D_{EP}$ in short conjugate space; where $|D_{EP}|/f_{MIN} \geq 2.0$ and preferably $|D_{EP}|/f_{MIN} \geq 2.5$. As used herein, "exit pupil distance in short conjugate space" is the distance between the exit pupil and the image at $f_{MIN}$.

In other preferred embodiments of the third and fourth aspects of the invention, the combination of the first and second lens units of the zoom objective lens unit or zoom lens has a back focal length $D_{BF}$ in short conjugate space such that $D_{BF}/f_{MIN} \geq 1.0$ and preferably $D_{BF}/f_{MIN} \geq 1.5$.

In still further preferred embodiments of the third and fourth aspects of the invention, $|f_1| \approx |f_2|$ e.g., $|(|f_2|-|f_1|)|/|f_2|$ is less than or equal to 0.2 and preferably is less than or equal to 0.1.

In accordance with a fifth aspect, the invention provides a camera which has an optical axis (1) and comprises:

(A) an objective lens unit (10) having a positive optical power;

(B) an erector lens unit (12) having a positive optical power; and (C) an eye lens unit (13) having a positive optical power; wherein:

(i) the optical axis (1) lies in a plane and has first and second folds (17,20) which define a first optical axis portion (22), a second optical axis portion (23), and a third optical axis portion (24);

(ii) the first (22) and third (24) optical axis portions are parallel but not collinear;

(iii) the second optical axis portion (23) is perpendicular to the first (22) and the third (24) optical axis portions, with the first optical axis portion (22) extended in one direction from the second optical axis portion (23) and the third optical axis portion (24) extended in the opposite direction from the second optical axis portion (23); and (iv) the optical axis of the objective lens unit (10) is collinear with the first optical axis portion (22), the optical axis of the erector lens unit (12) is collinear with the second optical axis portion (23), and the optical axis of the eye lens unit (13) is collinear with the third optical axis portion (24).

In certain preferred embodiments of the fifth aspect of the invention, the length of the first optical axis portion (22) between the object end of the objective lens unit and the first fold (17) is $L_1$, the length of the second optical axis portion (23) between the two folds (17,20) is $L_2$, the length of the third optical axis portion (24) between the second fold (20) and the image end of the eye lens unit (13) is $L_3$, and $$1.25(L_1+L_3) \geq L_2 \geq 0.75(L_1+L_3).$$

More preferably, $L_1$, $L_2$, and $L_3$ satisfy the relationship:

$$1.15(L_1+L_3) \geq L_2 \geq 0.85(L_1+L_3).$$

In the preferred embodiments of the invention, $L_2$ is less than or equal to 10 centimeters and preferably is less than or equal to 8 centimeters.

The foregoing aspects of the invention can be used alone or, preferably, in combination. When used in combination, digital cameras having integrated electronics and optics and having all of the desired features described above can be readily manufactured and used by professional and amateur photographers to frame, record, and recall high quality digital images.

DESCRIPTION OF PRIOR ART

Examples of zoom lens having a negative-positive (NP) configuration and employing aspherical surfaces include:

(1) U.S. Pat. No. 4,469,412 to Tajima et al. which illustrates the use of a single aspherical surface. While this approach can help to improve the optical performance of a lens at low cost, the use of one aspherical surface does not provide a very significant improvement in a cost/performance analysis.

(2) U.S. Pat. No. 4,560,253 to Ogino illustrates the use of a thin plastic substrate on a glass element to form an aspherical surface. In this design, the benefit of a glass lens element is maintained while the cost of adding the aspherical surface is modest. Only one aspherical surface, however, does not offer a significant cost/performance improvement.

(3) U.S. Pat. No. 5,054,897 to Ozawa is an example of using several aspherical surfaces, but in this case there is only one aspherical surface for any particular lens element. By restricting the application of aspherical surfaces to one per lens element, the ability to reduce sensitivity to manufacturing deviations by appropriate aberration balancing is minimal.

(4) In Japanese Laid Open Application 7-225338, an NP design is disclosed having two lens elements in the positive second lens unit that are aspherical on both surfaces. The first unit, however, includes only spherical elements, which makes the lens sensitive to manufacturing variations. In addition, the optical power distribution of this design is not adequate to provide for an extended exit pupil position required by some sensor units, nor would this type of design allow for the insertion of mirrors in the image space.

An example of the use of a relay lens unit to invert an image produced by an objective lens is shown in U.S. Pat. No. 5,523,885 to Aoki.

BRIEF DESCRIPTION OF THE DRAWINGS

FIGS. 1–3 illustrate the folded optical path used when the optical systems of invention are embodied in a digital camera. For ease of illustration, except for mirror 18, FIGS. 4–12 are drawn for a straight, rather than a folded, optical axis.

Figure 1A:
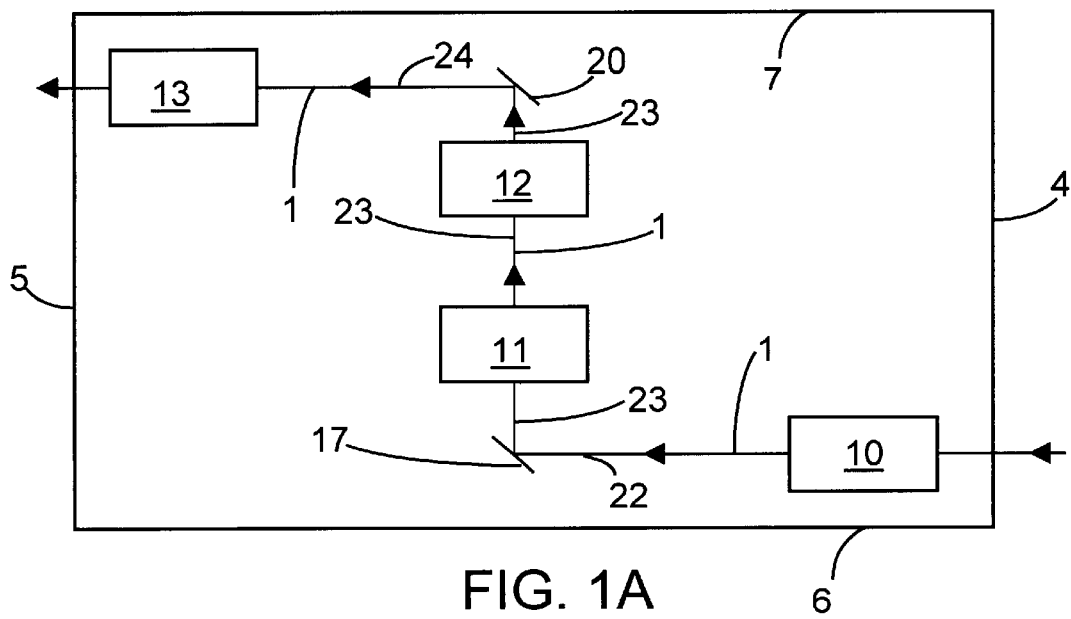
FIGS. 1A, 2A, and 3A are schematic diagrams illustrating the first to third optical paths (first to third modes) of the digital cameras of the invention, respectively.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

The reference numbers used in the drawings correspond to the following:

1 first optical path
2 second optical path
3 third optical path
4 front of camera
5 back of camera
6 right side of camera
7 left side of camera
8 top of camera
9 bottom of camera
10 objective lens unit
11 image size adjusting lens unit
12 erector lens unit
13 eye lens unit
14 sensor lens unit
15 sensor unit
16 display unit
17 first moveable mirror
18 second moveable mirror
19 first fixed mirror
20 second fixed mirror
21 field lens unit
22 first optical axis portion
23 second optical axis portion
24 third optical axis portion

DESCRIPTION OF THE PREFERRED EMBODIMENTS

As discussed above, the present invention relates to optical systems for digital cameras which preferably include the following five lens units: (1) an objective lens unit, (2) a sensor lens unit, (3) an erector lens unit, (4) an eye lens unit, and (5) an image size adjusting lens unit. The optical systems also preferably include a sensor unit, a display unit, and an optical switching system for transferring the systems between their first, second, and third optical paths. Preferred embodiments of these components of the invention are as follows.

Objective Lens Unit and Sensor Lens Unit

The objective lens unit has a positive power and is preferably of the zoom type, although a fixed focal length objective can be used if desired. A variety of zoom or fixed focal length objective lens units known in the art can be used in the practice of the invention.

When a zoom objective lens unit is used, the unit preferably has the following paraxial characteristics:

(1) an effective focal length range of at least 2:1 and preferably 3:1;
(2) a relative aperture of approximately f/3 or faster at the wide angle focal length;
(3) a semi-angular field of view of at least 30 degrees at the wide angle focal length;
(4) a back focal distance (i.e., a distance in image space) sufficient for insertion of two fold mirrors in perpendicular orientation (e.g., mirrors 17 and 19); and
(5) an extended exit pupil location so as to minimize the angle of the principal rays at the image sensor.

In addition, the lens design must be suitable for mass production at very low cost.

These requirements can be satisfied by a zoom lens design of the negative-positive (NP) type where a negative first lens unit is followed by a positive second lens unit. The first lens unit moves for compensating or focusing or both compensating and focusing. Movement of the second lens unit provides the internal magnification change required to effect a change in focal length. Among other reasons, such a negative-positive system is preferred since it is the simplest form for producing an extended exit pupil as required for some sensor units.

Moreover, it has been found that a negative-positive zoom objective lens suitable for use in the optical systems of the invention can achieve a 3:1 zoom range and still have a relaxed configuration, i.e., a configuration in which the power of each unit is relatively low and the magnitudes of the powers of the units are substantially equal to each other. Such a relaxed configuration, in turn, means that each unit can have a simple construction. In particular, a relaxed construction automatically provides correction for field curvature, assuming the two units are made of similar materials.

To reduce sensitivity to manufacturing tolerances, double aspheres are used on at least one lens element in each unit and preferably on at least two lens elements in each unit. In addition to performing this function, the aspheres are also designed to correct the aberrations of the system. As used herein, "double aspheres" means a lens element having an asphere on each of its surfaces.

In certain preferred embodiments of the invention, the objective lens unit of the invention has some and preferably all of the following structural features:

(1) The first lens unit consists in order from its object end of a negative power first lens element, a positive power second lens element, and a negative power third lens element.

(2) The objective lens unit includes an aperture stop which is located between the first and second lens units. Preferably, the aperture stop is closer to the second lens unit than to the first lens unit, e.g., the aperture stop is placed in front of the second lens unit.

(3) When in its wide field of view configuration, the first lens unit can be moved towards a near object to focus on the object, e.g., the first lens unit can be moved forward from its normal wide field of view position by an additional 0.5 millimeters.

There are two basic characteristics of the zoom lenses of the invention that distinguish them from the prior art: (1) the design is based on the use of two aspherical surfaces for lens elements in order to reduce sensitivity to manufacturing variations; and (2) the optical power ratio of the negative and positive units is such that the exit pupil position as measured from the image sensor is maximized.

A third ancillary characteristic is the use of the zoom objective lenses in combination with a sensor lens unit 14 near or adjacent to the image sensor 15 to further allow for decreased sensitivity to manufacturing variations or to further extend the distance from the sensor to the exit pupil.

In particular, the sensor lens unit can help correct distortion and reduces manufacturing sensitivity of the objective lens unit. Because it is located close to sensor unit 15, i.e., close to the image, its manufacturing tolerances are not particularly critical. Thus, in accordance with the invention, a low tolerance and thus inexpensive lens unit is used to facilitate manufacture of a lens unit (the objective lens unit) whose optical performance is critical to the recordation of high quality digital images. The sensor lens unit is preferably a single lens element of weak power, e.g., weak positive power, having at least one aspheric surface.

Erector Lens Unit

The erector lens unit has a positive power and serves to invert and revert the image produced by the objective lens unit during TTL viewing of a scene to be photographed. Since this unit also inverts and reverts the image of display unit 16 seen by the user, the recalled pictures displayed by the display unit should be inverted and reverted so that the final images seen by the user are neither inverted nor reverted. Note that in some embodiments, the eye lens unit can be used to view the display directly (see, for example, the right hand embodiment of FIG. 5). In such a case, the recalled image displayed by the display unit will not be an inverted and reverted image.

The erector lens unit preferably has some and most preferably all of the following characteristics:

(1) The unit works at an approximately 1:1 magnification.

(2) The unit provides aberration correction, including chromatic aberration correction, for the eye lens unit so that the eye lens unit can be, for example, a single lens element. The chromatic aberration correction can be provided by, for example, employing lens elements having different dispersions and/or through the use of a diffractive surface.

(3) The unit, through its positive power, allows the eye lens unit to have a longer effective focal length which, in turn, makes it easier to provide the user with 18–20 millimeters of eye relief as is desired in order to allow people who wear glasses to use the optical system while wearing their glasses. Preferably, the combination of the erector lens unit and the eye lens unit has an effective focal length of between about 10 millimeters and about 17 millimeters, with the erector lens unit having a long focal length and the eye lens unit having a focal length between about 10 millimeters and about 15 millimeters.

(4) The unit has nearly telecentric entrance and exit pupils. Such telecentricity eliminates the need for a field lens between the erector lens unit and the eye lens unit. It also allows for a reduction in the power of the image size adjusting lens unit when used. Similarly, if a field lens unit is used between the objective lens unit and the erector lens unit instead of an image size adjusting lens unit, then the telecentricity of the erector lens unit allows the power of such a field lens unit to be reduced.

To achieve such telecentricity, the erector lens unit preferably should have three subunits, e.g., three lens elements, to be able to bend the principal rays, wherein the outer surfaces of the two outer subunits each have positive power and at least one internal surface that has negative power to correct field curvature. Note that the negative surface can be on an overall positive lens element (see, for example, FIG. 4).

Eye Lens Unit

The eye lens unit, which has a positive power, serves as a magnifier of the intermediate real image formed by the erector lens unit. The eye lens unit and the erector lens unit thus comprise a compound microscope, with the eye lens unit forming an almost telecentric, virtual image of the intermediate image produced by the erector lens unit.

Figure 5:
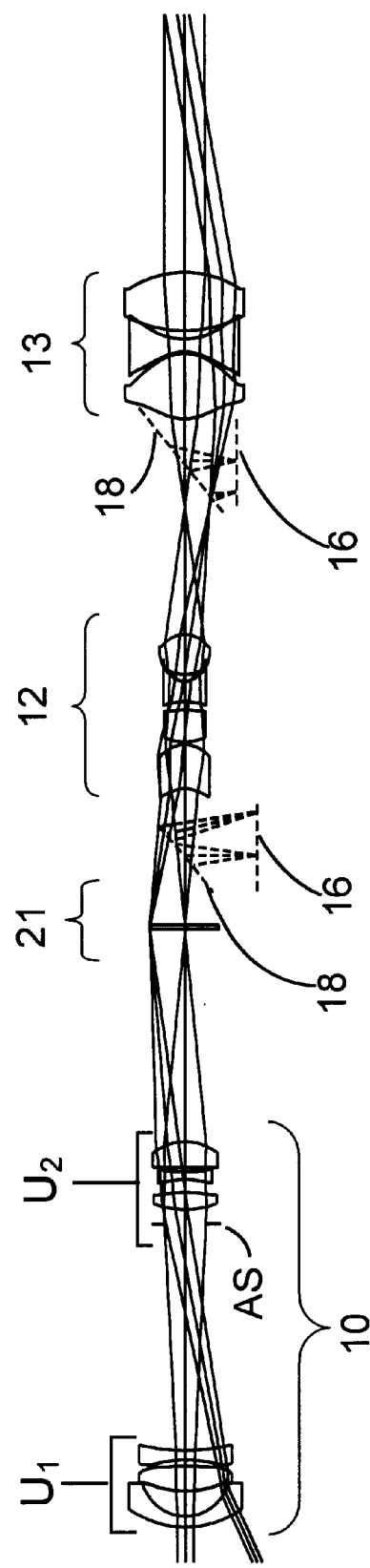

In some embodiments, the eye lens unit can be used to directly view the display unit without the use of the erector lens unit (see, for example, the right hand embodiment of FIG. 5). In this case, the eye lens unit will preferably include multiple lens elements to provide color correction for the image of the display unit.

When used with an erector lens unit, the eye lens unit is preferably a single lens element and most preferably a single glass element so that it is resistant to scratching.

Preferably, the eye lens unit is mounted in a diopter barrel so that the user can adjust the location of the unit along the system's optical axis to accommodate his or her individual vision capabilities.

Image Size Adjusting Lens Unit

The image size adjusting lens unit, when used, serves to provide the user with a TTL image and a recall image of substantially the same size.

Without a size adjusting lens unit, the TTL image will in general be larger than the image of display unit 16, although in some cases it could be smaller. As a result, the image of the display unit will appear peculiar to the user since it will not fill the user's full field of view. Accordingly, in most applications, the image size adjusting lens unit serves to reduce the size of the TTL image, although it can be used to increase the size of the TTL image if that should be desired. In addition to adjusting image sizes, this unit also functions as a field lens unit.

The unit is located in the vicinity of the intermediate image produced by the objective lens unit. As illustrated by the examples presented below, the image size adjusting lens unit is preferably located either ahead of or behind the intermediate image. When located ahead of the intermediate image, the unit can be thought of as performing its size adjusting function by changing the effective focal length of the objective lens unit; when located after the intermediate image, it can be thought of as performing its function by changing the combined focal length of the erector lens unit and the eye lens unit. Although not preferred, the intermediate image can lie within the image size adjusting unit.

The image size adjusting lens unit preferably includes negative and positive power for color correction. Its focal length is defined by the locations of the exit pupil of the objective lens unit and the entrance pupil of the erector lens unit since the image size adjusting lens unit's entrance and exit pupils need to correspond, respectively, to those upstream and downstream pupils. As a result, in order to perform its change of magnification function in image/object space, the unit must have separated principal planes (principal points). Thus, the unit cannot be a single thin lens.

The image size adjusting unit can include a field stop in the vicinity of the intermediate image produced by the objective lens unit. A field stop can be used even if an image size adjusting unit is not used, again in the vicinity of the intermediate image. Similarly, a field lens unit can be used in the vicinity of the intermediate image without performing the function of adjusting the size of the TTL image.

Sensor and Display Units

When the overall optical system is in its third mode (i.e., its picture taking mode), the real image produced by the objective lens unit is recorded by an electronic sensor associated with a suitable computer memory. The sensor can be a CMOS or other suitable device (e.g., a CCD device) for detecting electromagnetic radiation in the visible range. In some applications of the invention, e.g., a digital night vision camera, the sensor will detect non-visible electromagnetic radiation, e.g., infrared radiation.

When the overall optical system is in its second mode, previously recorded pictures can be recalled from display unit 16. This unit can take a variety of forms, e.g., it can be an LCD microdisplay, including a reflective LCD microdisplay. The unit is associated with the computer memory in which the previously recorded images are stored and with a suitable electronic controller for allowing the user to access one or more previously recorded images.

Optical Switching System

Figure 2A:
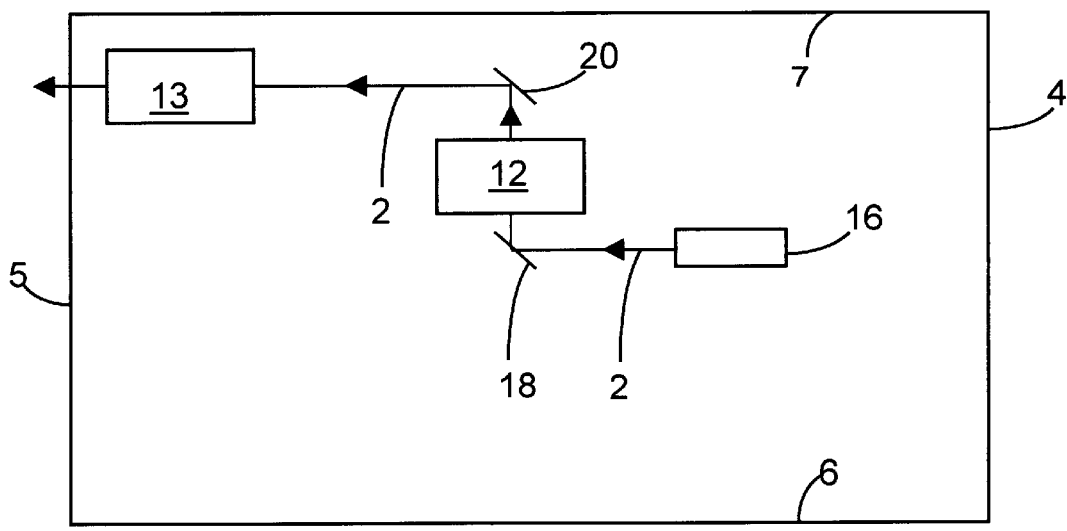
Figure 3A:
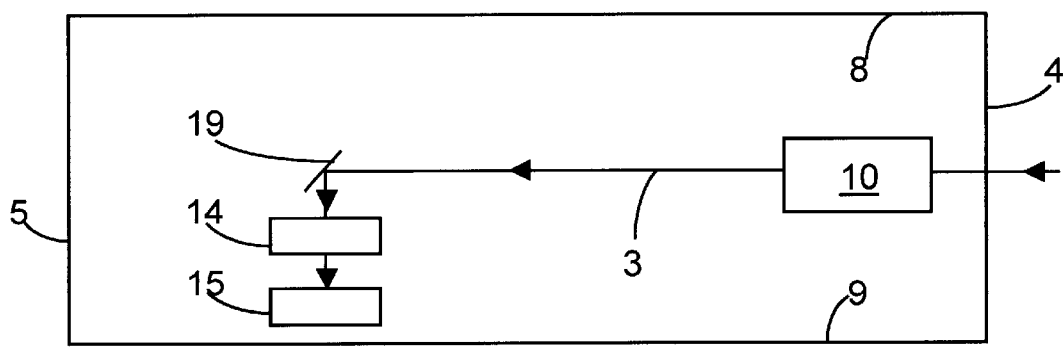
Figure 1B:
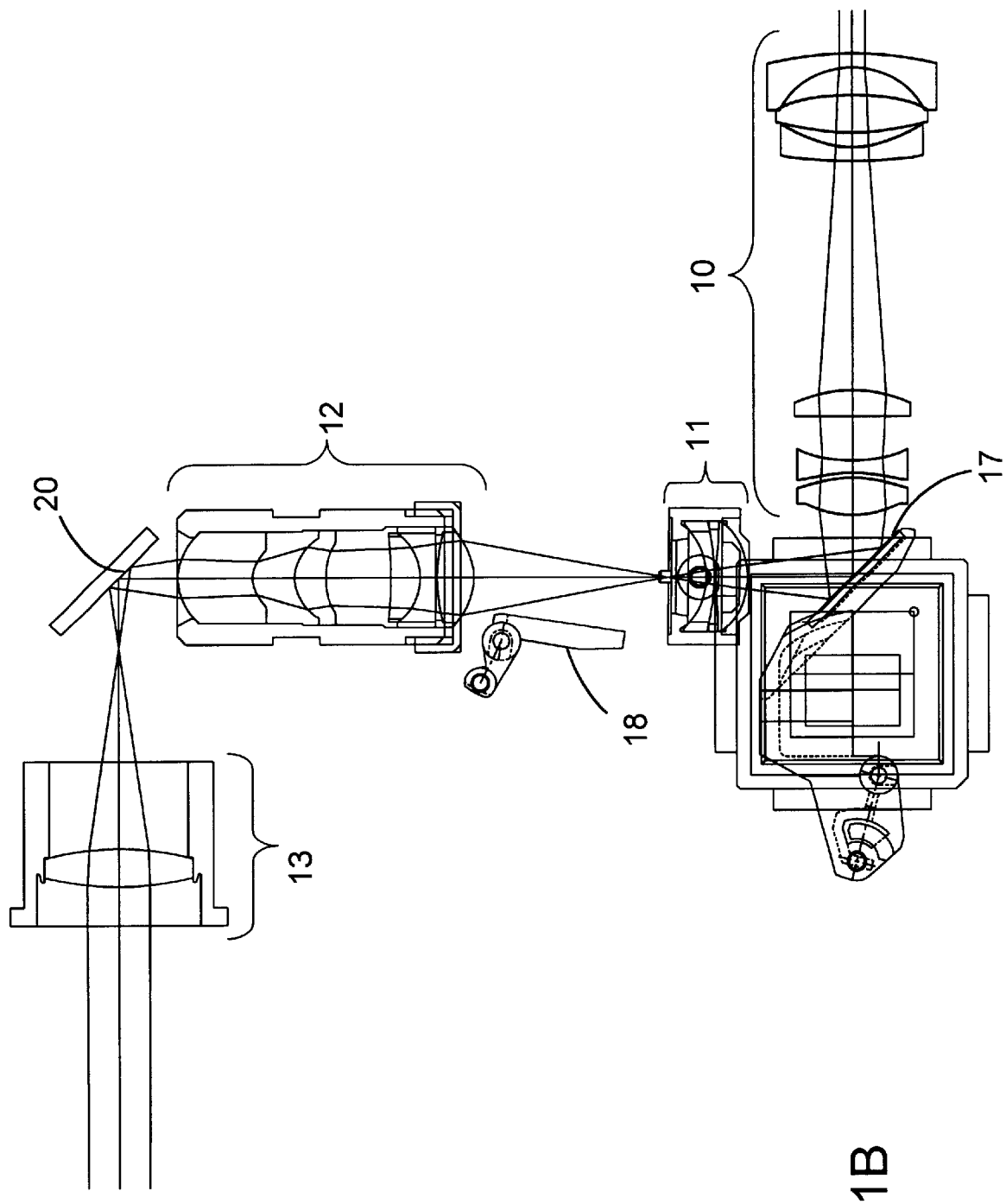
FIGS. 1B, 2B, and 3B show suitable component layouts for the first to third optical paths of FIGS. 1A, 2A, and 3A, respectively.
Figure 2B:
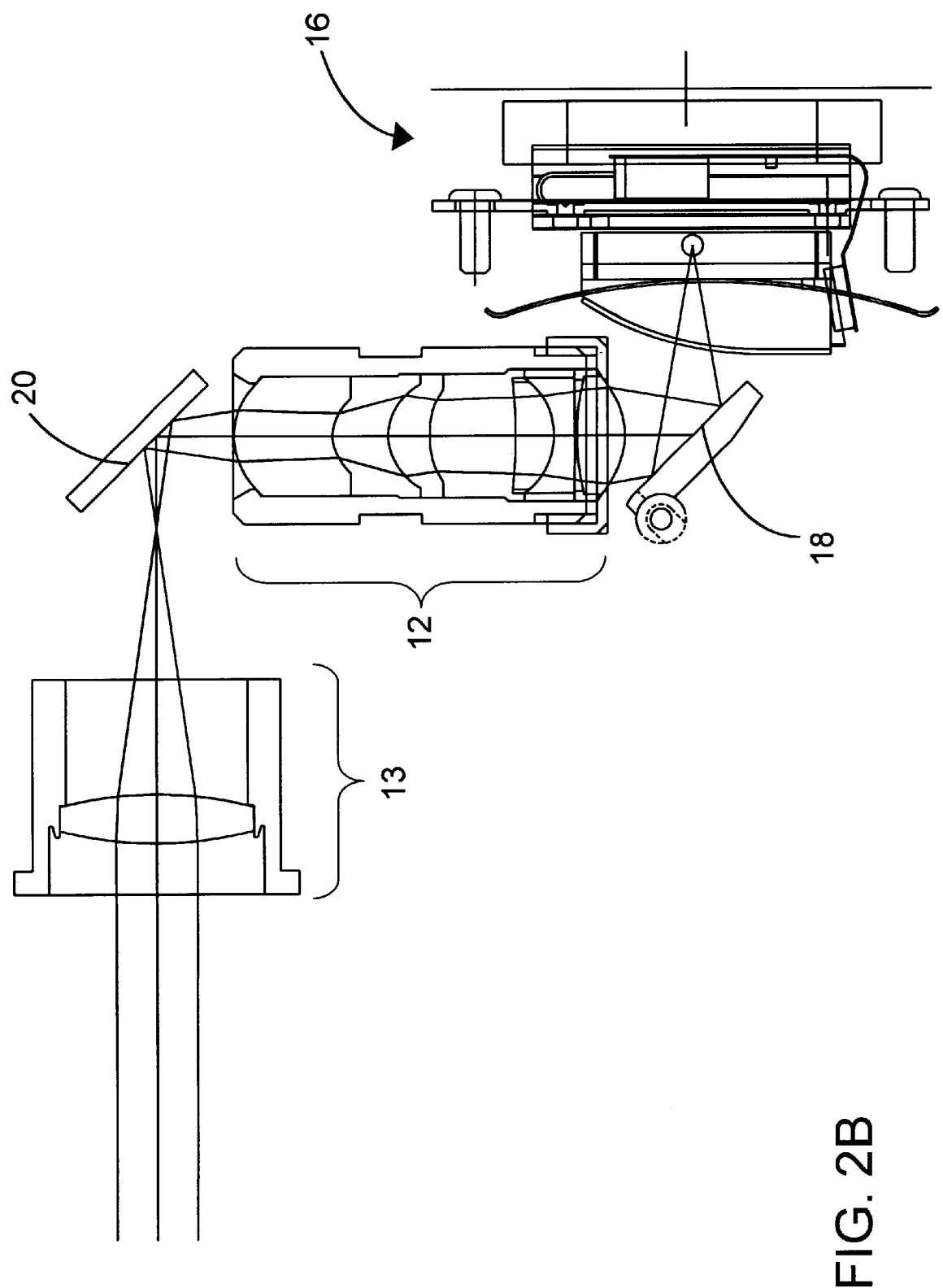
Figure 3B:
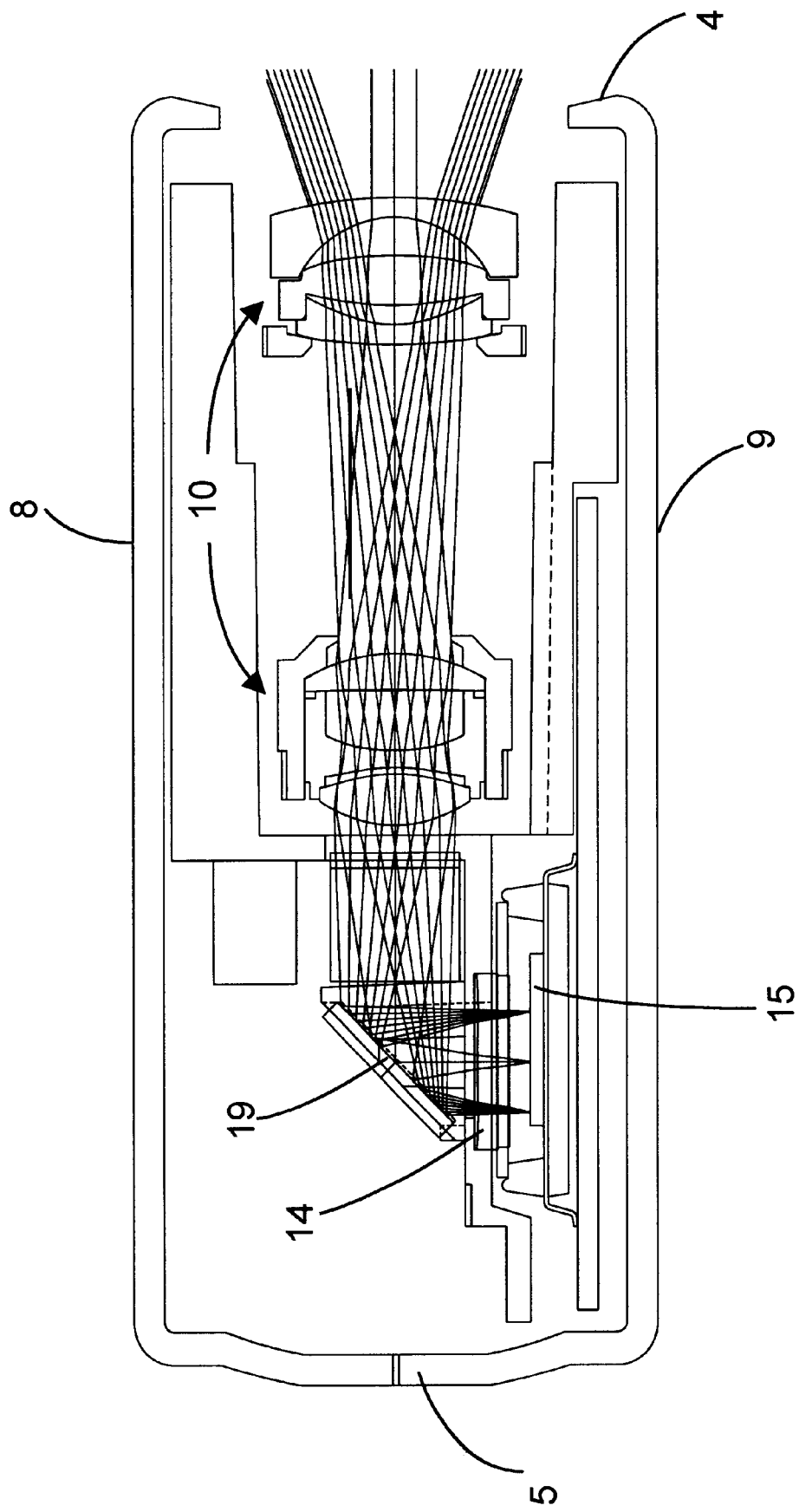

The optical switching system comprises moveable mirrors 17 and 18 in FIGS. 1–3, as well as fixed mirrors 19 and 20. The combination of mirrors 17 and 20, as well as the combination of mirrors 18 and 20, constitutes a periscope which does not invert or revert the image seen by the user. Accordingly, erector lens unit 12 is only required because of the inversion and reversion introduced by objective lens unit 10.

Movement of the moveable mirrors between their home positions and their moved position can be accomplished by a variety of techniques known in the art, e.g., rotating, sliding, flipping, etc. As shown in FIGS. 1–3, the home position of moveable mirror 17 corresponds to the optical path of FIG. 1, while the moved position corresponds to the optical path of FIG. 3. For moveable mirror 18, the home position corresponds to the optical path of FIG. 1, while the moved position corresponds to the optical path of FIG. 2.

In practice, moveable mirrors 17 and 18 can move together, even though only one of the mirrors needs to move to perform the desired optical switching function. For example, when mirror 17 moves to its moved position to switch the optical system to its third optical path, mirror 18 can move to its position shown in FIG. 2. Conversely, when mirror 18 moves to its moved position to switch the optical system to its second path, mirror 17 can move to its FIG. 3 position.

Fixed mirror 19 is preferably a cold mirror which passes, rather than reflects, infrared radiation, thus protecting sensor unit 15 from such radiation. In cases where auto-focusing is desired, moveable mirror 17 can include a transparent portion, e.g., a transparent stripe, which allows some light to reach sensor unit 15 during through-the-lens viewing. As known in the art, by sensing this light, the focus of the objective lens unit can be automatically adjusted.

Because the optical systems of the invention are used with digital cameras which have a "book" format (see below), mirrors 17, 18, and 20 fold the optical axis along the long dimension of the picture, rather than the short dimension, as is conventional.

Overall Camera Layout As illustrated in FIGS. 1–3, the digital cameras in which the optical systems of the invention are used preferably have a "book" format in which, during TTL viewing, light enters the front 4 of the camera at one side (side 6 in FIG. 1A), passes through objective lens unit 10, erector lens unit 12, and eye lens unit 13, and then leaves the back 5 of the camera to enter the user's eye at the camera's opposite side (side 7 in FIG. 1A). The light takes this path while remaining in a single plane through the use of two folding mirrors 17 and 20. To take a picture, one of the two folding mirrors, e.g., mirror 17, is moved out of the optical path, so that the light can reach fixed mirror 19 where it is turned out of the common plane and directed towards sensor unit 15.

A "book" format is desirable since it provides a compact design while still allowing sufficient space for zooming without the need for collapsible optics. It also provides a camera shape which is easy for a user to hold steady while taking a picture.

EXAMPLES

Without intending to limit it in any manner, the present invention will be more fully described by the following examples which are illustrated in FIGS. 4–12 and Tables 4–13.

In particular, FIGS. 4 to 8 illustrate first and second optical paths and FIGS. 9 to 12 illustrate third optical paths for optical systems constructed in accordance with the invention. The corresponding prescriptions are set forth in Tables 4–12. The prescriptions of these tables use the "OSLO" format of the optical design program sold under that trademark by Sinclair Optics Inc., Rochester, N.Y. All dimensions in Tables 4–13, as well as in Tables 1–3, are in millimeters.

The distances between display unit 16 and the most object side surface of erector lens unit 12 in FIGS. 4, 6, 7, and 8 are 12.5, 12.4, 12.3, and 12.3 millimeters, respectively. Two possible locations for display unit 16 are shown in FIG. 5: (1) a first location where light from the display unit passes through both erector lens unit 12 and eye lens unit 13, and (2) a second location where the light only passes through eye lens unit 13. The distance between display unit 16 and the most object side surface of erector lens unit 12 for the first location is 10.9 millimeters, while for the second location, the distance between display unit 16 and the most object side surface of eye lens unit 13 is 6.8 millimeters.

Figure 4:
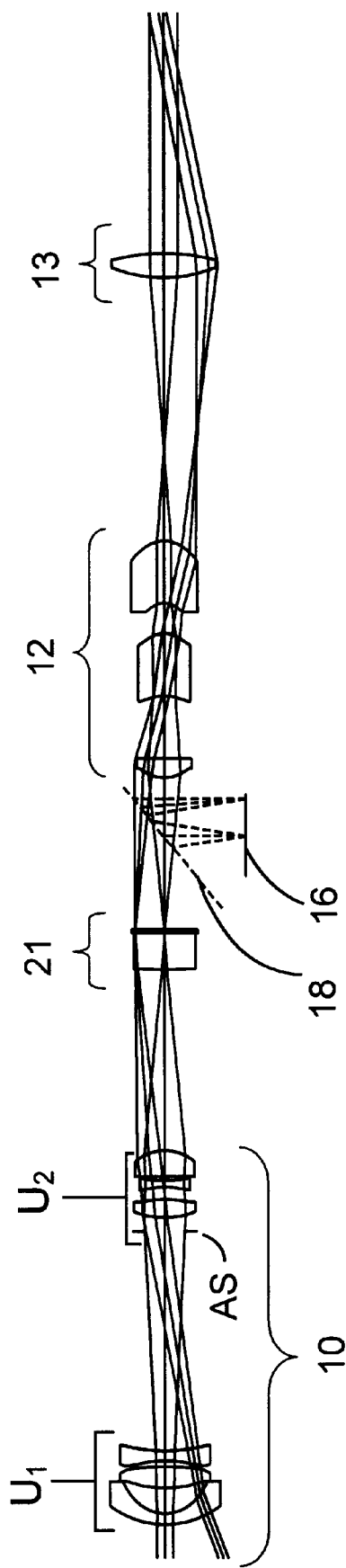
FIGS. 4 to 8 are schematic side views illustrating first and second optical paths for optical systems constructed in accordance with the invention.

FIG. 4 (Table 4) Embodiment

For this system, a Fresnel field lens is located near the intermediate image produced by the objective lens unit and the erector lens unit uses a diffractive surface to correct for chromatic aberration. A single element eye lens unit magnifies the erect image formed by the erector lens unit.

By using a Fresnel lens and a diffractive lens element, manufacturing expense can be minimized. The eye lens unit can be a molded plastic element, or a glass spherical element can be used to reduce the possibility of scratches. Note that this example does not include an image size adjusting lens unit.

FIG. 5 (Table 5) Embodiment

If it is desirable to place the display device between the erector lens unit and the eye lens unit, then the eye lens unit must be corrected by itself for aberrations, and therefore a single lens element is not sufficient, so a triplet anastigmat is used. A Fresnel lens surface is used as a field lens element. As in FIG. 4, this example does not have a image size adjusting lens unit.

Figure 6:
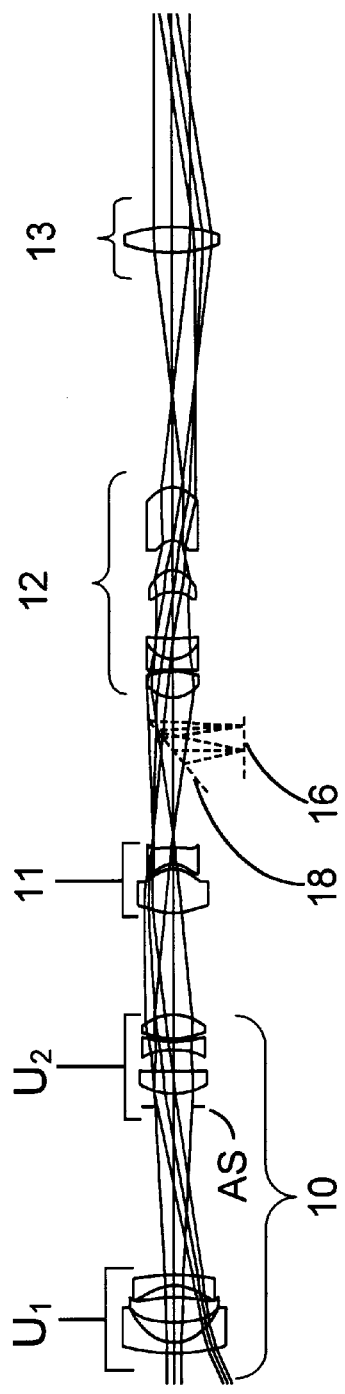

FIG. 6 (Table 6) Embodiment

The function of the image size adjusting lens unit (compactor unit in this example since it makes the image smaller) is to permit viewing of a display device (display unit) that is not the same size as the image formed by the zoom objective lens unit. In this example, the compactor is placed between the zoom objective lens unit and its image surface. The compactor also performs the function of a field lens, i.e., it images the exit pupil of the unit which forms the intermediate image, i.e., the zoom objective lens unit, into the entrance pupil of the unit that receives the intermediate image, i.e., the erector lens unit.

Figure 7:
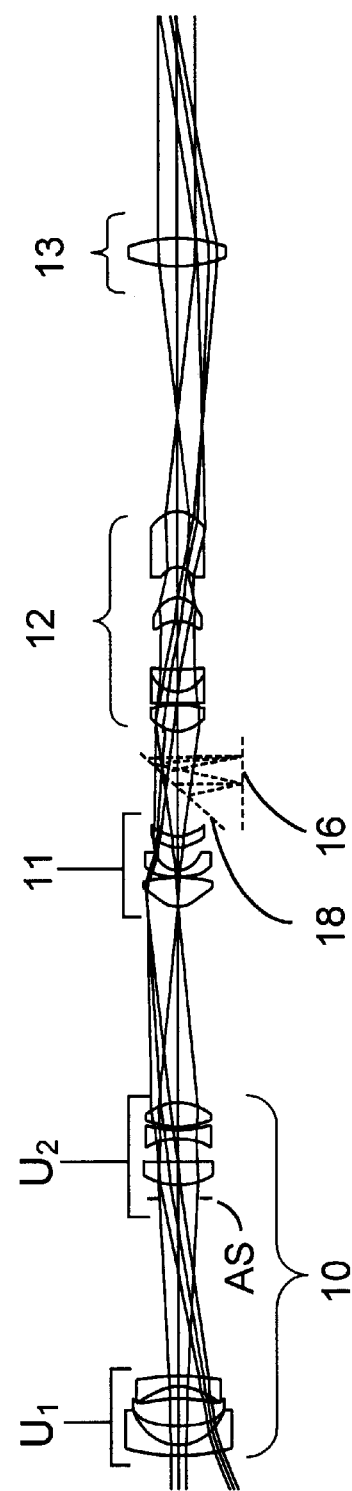

FIG. 7 (Table 7) Embodiment

In this example, the image size adjusting lens unit (compactor unit in this example) is placed between the image formed by the zoom objective lens unit and the erector lens unit. Because it must provide the appropriate magnification to match the size of the display unit with that of the image sensor, and also perform a field lens function, in its preferred configuration, the image size adjusting lens unit will have both positive and negative lens elements.

Figure 8:
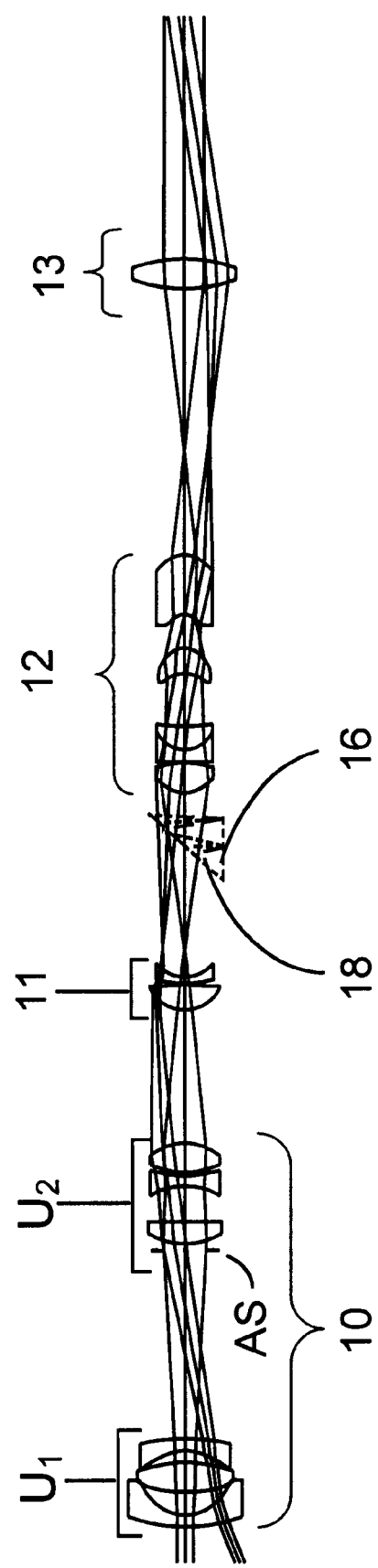

FIG. 8 (Table 8) Embodiment

In this example, the image size adjusting lens unit (compactor unit in this example) is placed in the space between the zoom objective lens unit and its image surface so as to maximize the mechanical space available for a moveable mirror between the image surface after the compactor and before the erector lens unit.

Figure 9A:
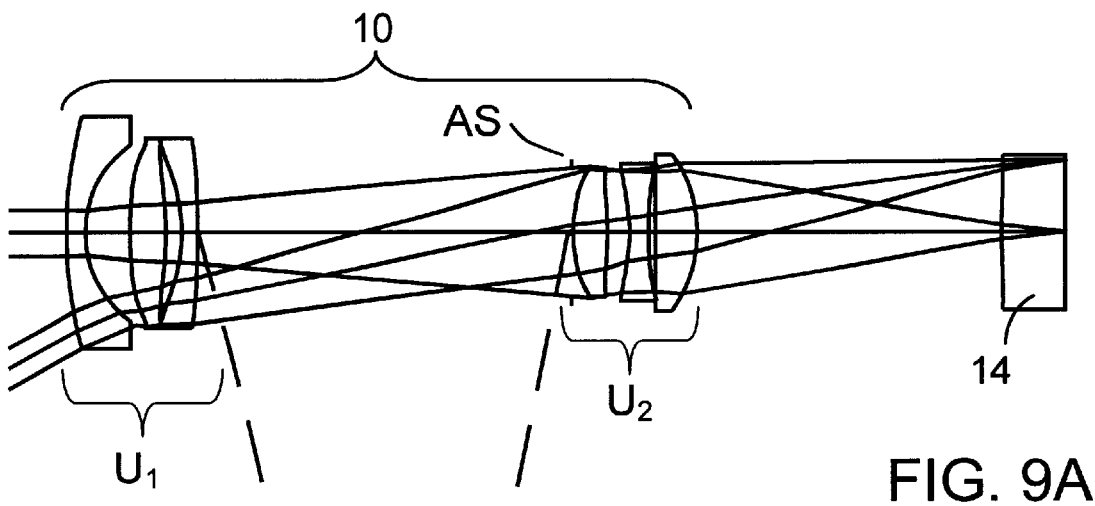
FIGS. 9A, 9B, 9C, FIGS. 10A, 10B, 10C, FIGS. 11A, 11B, 11C, and FIGS. 12A, 12B, 12C are schematic side views illustrating third optical paths for optical systems constructed in accordance with the invention. In each figure, panels A, B, and C show the objective lens unit (10) of the optical system in its short, intermediate, and long focal length positions, respectively.
Figure 9B:
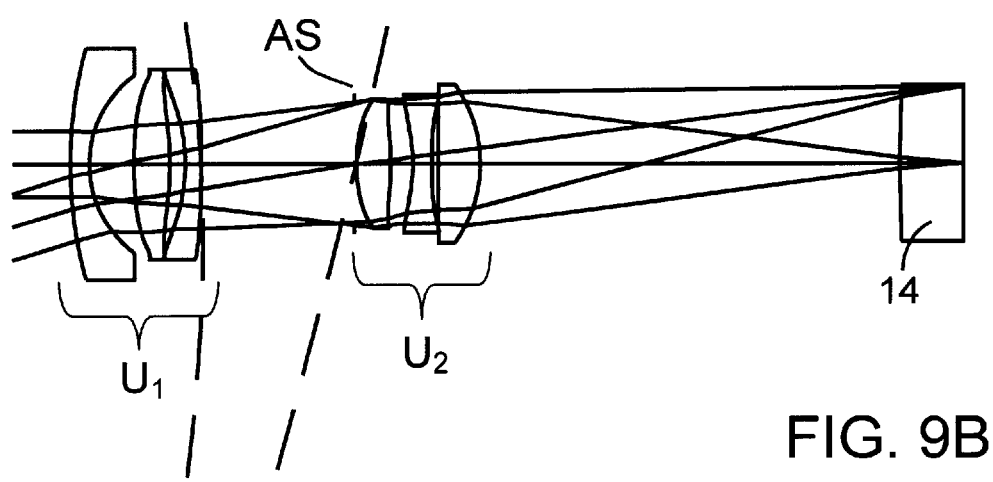
Figure 9C:
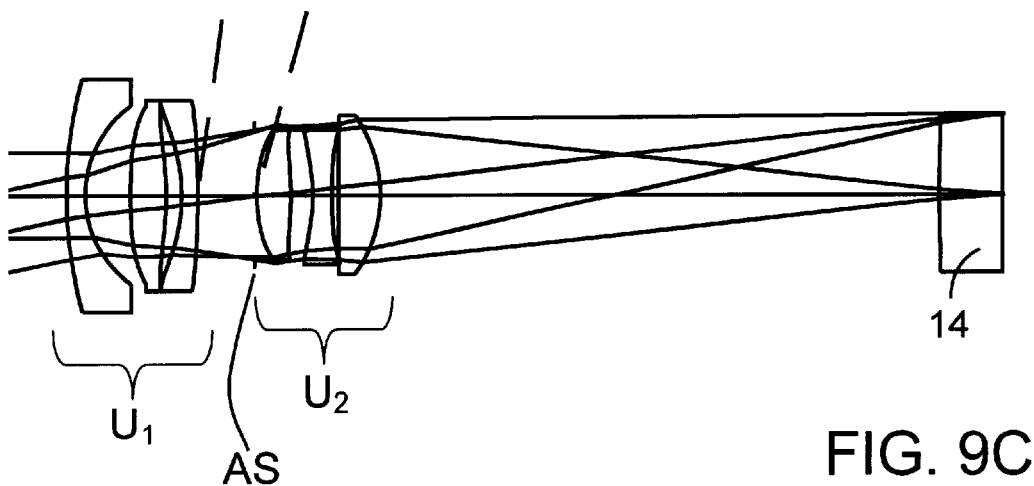

FIG. 9 (Table 9) Embodiment

This example illustrates a zoom objective lens unit and a sensor lens unit optimized for high performance. The first lens element is composed of optical glass to be resistant to scratches. The last lens element of the second lens unit is also composed of optical glass and has only spherical surfaces. While this lens element could be modified to be composed of plastic, the additional aspherical surface figure tolerances would be excessively small. The positive power lens element closest to the image, i.e., the sensor lens unit increases the distance to the exit pupil.

Figure 10A:
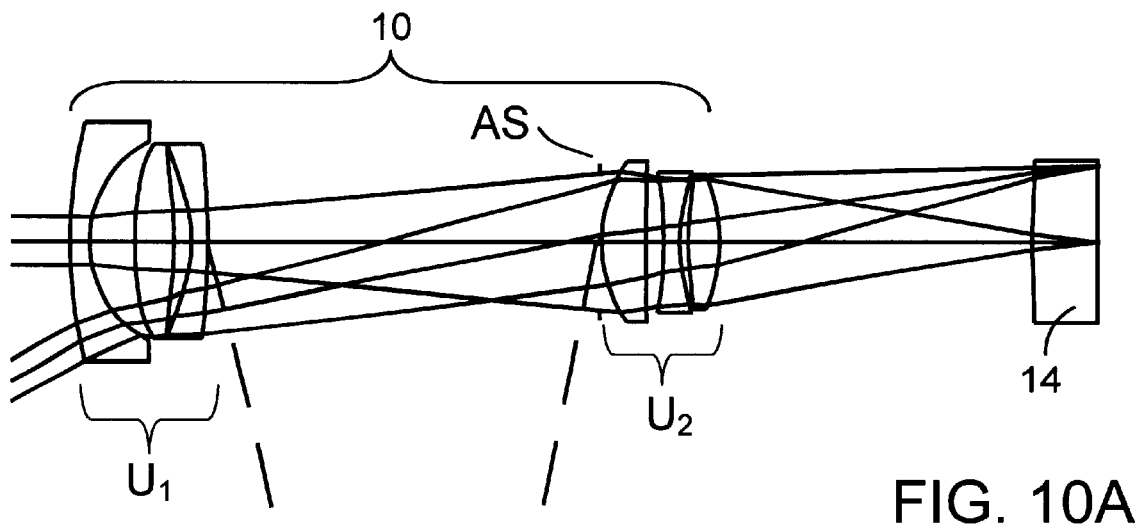
Figure 10B:
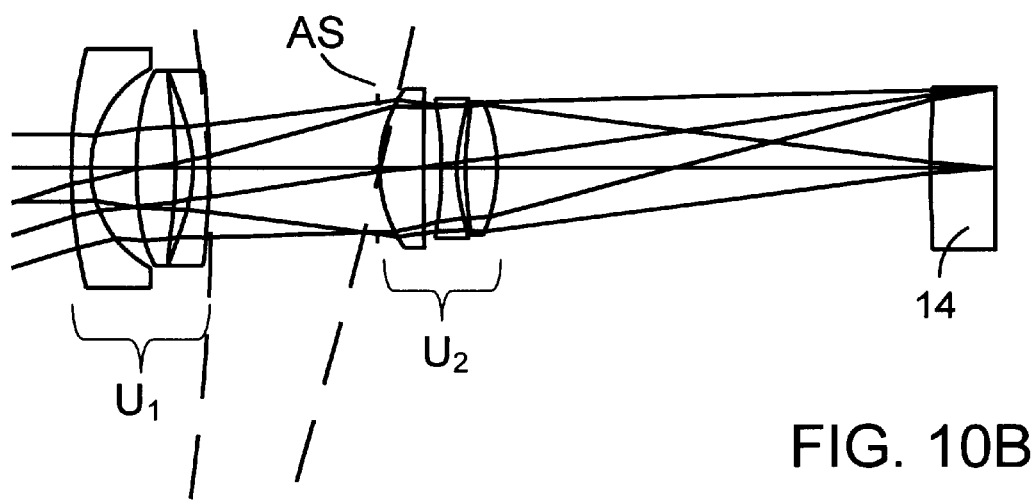
Figure 10C:
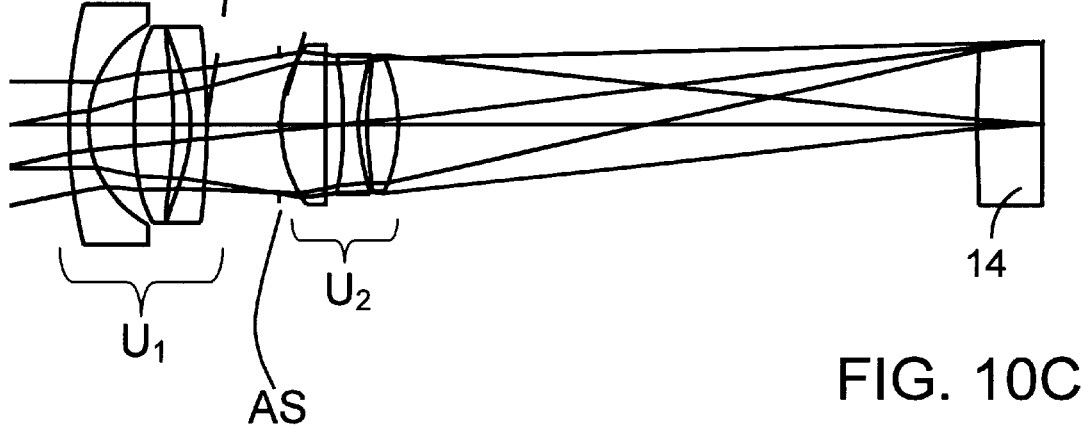
Figure 11A:
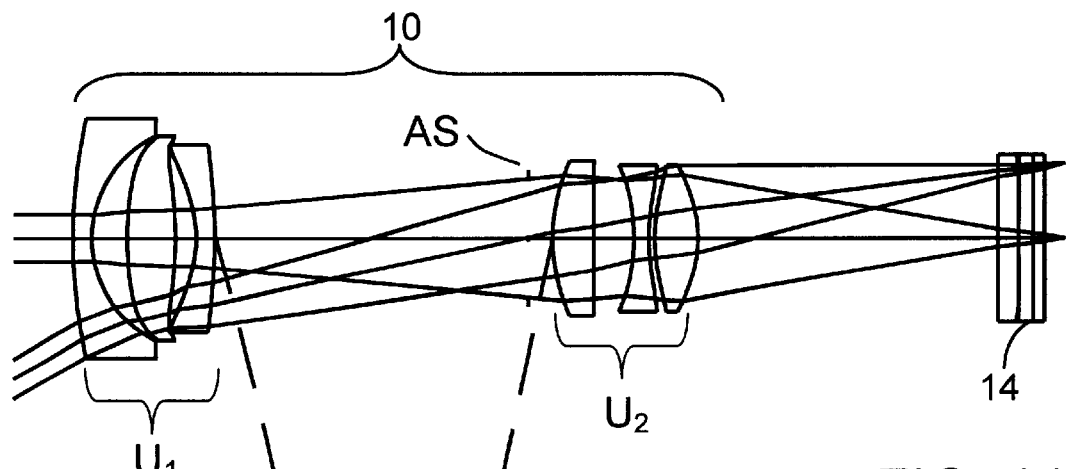
Figure 11B:
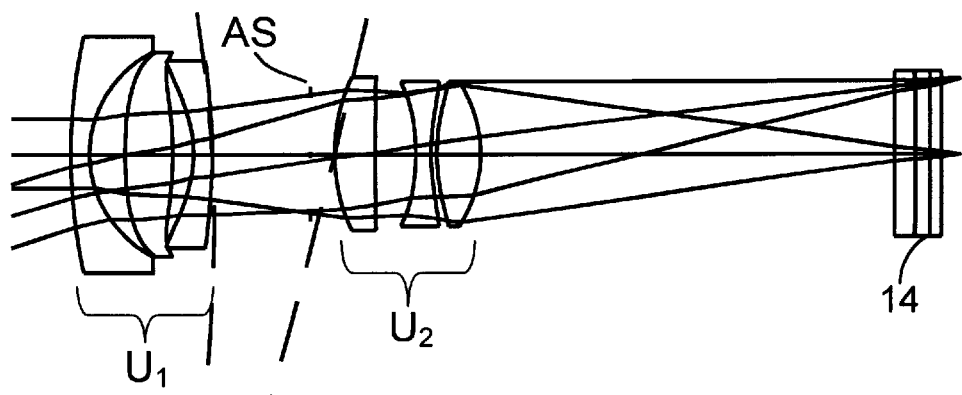
Figure 11C:
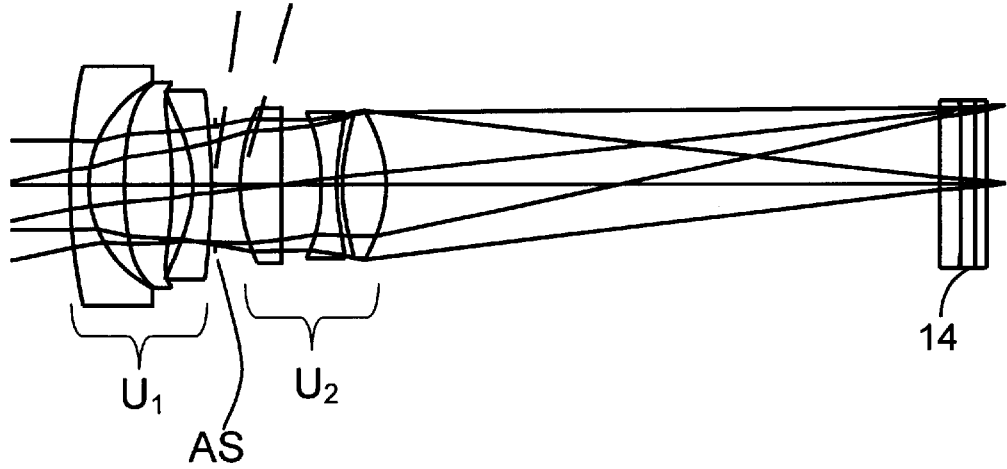
Figure 12A:
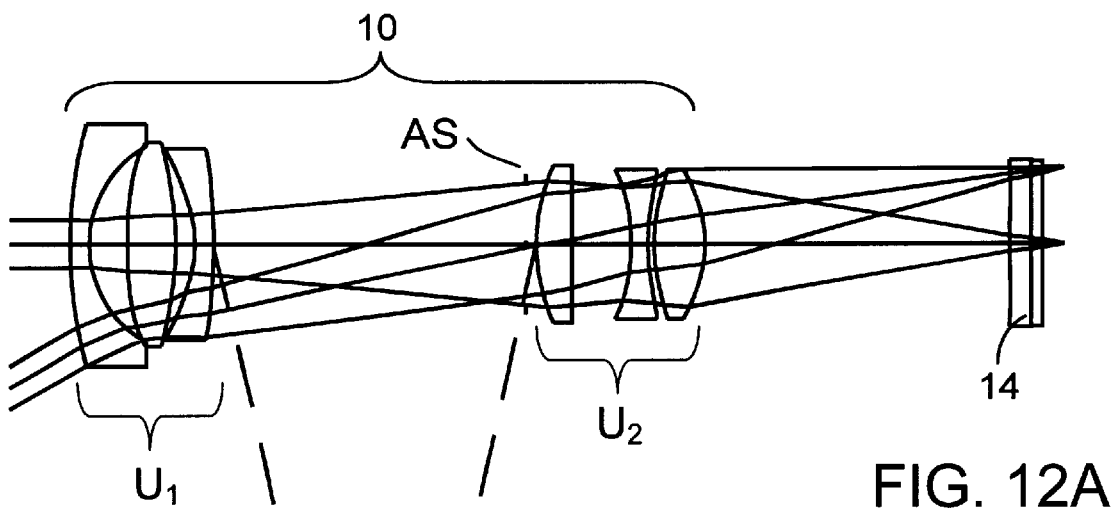
Figure 12B:
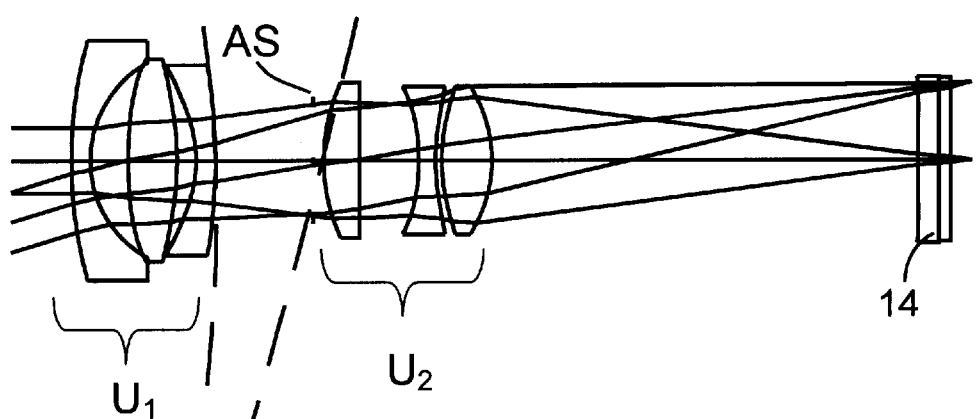
Figure 12C:
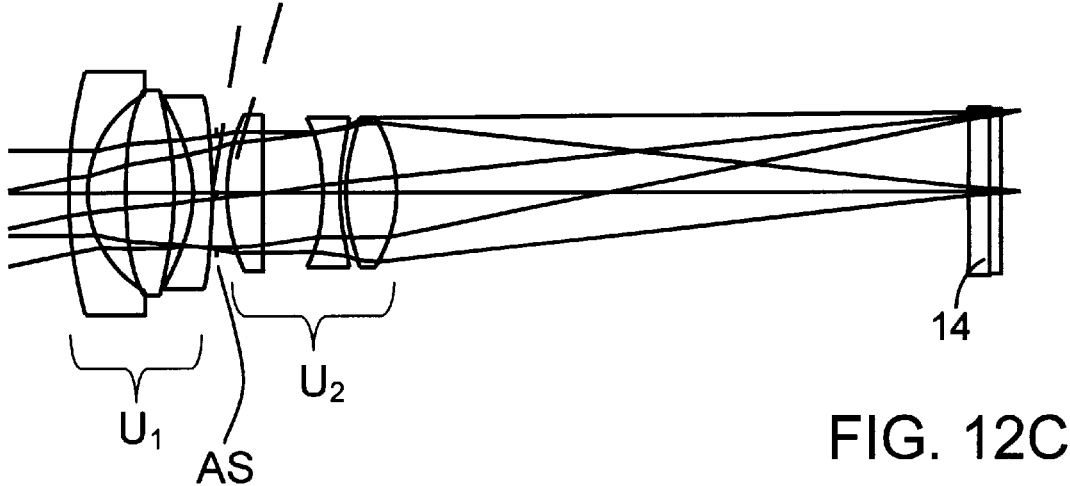

FIGS. 10, 11, & 12 (Tables 10, 11 & 12) Embodiments

In these examples, the aspherical surfaces have been optimized so that the individual lens elements are less sensitive to manufacturing variations. In addition, the placement order of the glass lens element of the second lens unit has been changed from the last position of this unit to the first position.

Table 13 Embodiment

For this zoom objective lens unit, the aspherical surfaces are placed on the positive lens element of the first lens unit, the second positive lens element of the second lens unit, and the sensor lens unit. The aspherical surfaces of this embodiment cannot obtain the full manufacturing advantages achieved when more aspherical surfaces are used. However, all of the aberrations are corrected, and it is not necessary to mold the more difficult negative elements. Either of the positive lens elements of the second lens unit can be restricted to only spherical surfaces and the same correction can be obtained. The overall appearance of this embodiment is similar to the embodiments of FIGS. 9–12.

As can be seen from prescription Tables 9–13, the zoom objective lens units of the invention achieve a wide field of view, a large aperture, and a large zoom range with a small number of lens elements.

Tables 1–3 summarize various of the properties of the examples of Tables 4–13. As can be seen in Tables 1 and 3, as well as in prescription Tables 4–13, the examples have the preferred properties for optical systems for use in digital cameras discussed above.

Table 2 gives the magnifications of the erector lens unit and the image size adjusting unit for the examples of Tables 4–8. The overall magnification of the system is equal to the focal length of the objective lens unit times the magnification of the intermediate lens units, i.e., the erector lens unit (when used) and the image size adjusting lens unit, divided by focal length of eye lens unit. As can be seen from this table and Table 1, the overall magnification is equal to 1.0 for an intermediate focal length of the objective lens unit as is desirable for a zoom system.

Submitted simultaneously herewith is commonly-assigned U.S. patent application Ser. No. 09/493,355, entitled "Compact Through-The-Lens Digital Camera,", which describes camera structures with which the optical systems of this invention may be used. In particular, the first and second optical paths of FIG. 8 and the third optical path of FIG. 12 were designed for use with the camera structure of this commonly-assigned application, the content of which in its entirety is incorporated herein by reference.

Although preferred and other embodiments of the invention have been described herein, further embodiments may be perceived by those skilled in the art without departing from the scope of the invention as defined by the following claims.

TABLE 1

| System Example | $f_{MIN}$ | $f_{MAX}$ | $f_{EYE\ PIECE}$ |
|---|---|---|---|
| Table 4 | 6.6 | 18.4 | 14.4 |
| Table 5 | 6.6 | 17.5 | 6.6 |
| Table 6 | 6.6 | 18.4 | 13.7 |
| Table 7 | 6.6 | 18.4 | 13.7 |
| Table 8 | 6.6 | 18.5 | 13.7 |

TABLE 2

| System Example | $m_{COMPACTOR}$ | $m_{ERECTOR}$ |
|---|---|---|
| Table 4 | — | −1.27 |
| Table 5 | — | −.673 |
| Table 6 | 1.07 | −1.23 |
| Table 7 | 0.68 | −1.23 |
| Table 8 | 0.69 | −1.23 |

TABLE 3

| Objective Example | $f_1$ | $f_2$ | $f_{MIN}$ | $f_{MAX}$ | $D_{EP}$ | $D_{BF}$ |
|---|---|---|---|---|---|---|
| Table 9 | −12.4 | 12.7 | 6.5 | 18.0 | −30.8 | 16.5 |
| Table 10 | −12.3 | 12.7 | 6.5 | 18.0 | −32.5 | 16.5 |
| Table 11 | −12.1 | 12.6 | 6.5 | 18.0 | −39.2 | 16.9 |
| Table 12 | −11.8 | 12.7 | 6.5 | 18.0 | −41.7 | 16.5 |
| Table 13 | −11.7 | 12.8 | 6.7 | 18.0 | −45.8 | 17.1 |

TABLE 4

| SFr | RADIUS | THICKNESS | APERTURE RADIUS | GLASS |
|---|---|---|---|---|
| OBJ | — | 1.0000e+20 | 4.6631e+19 | AIR |
| 1 | 10.689719 | 0.900000 | 5.500000 | SK16 |
| 2 | 4.693897 | 2.055421 | 4.200000 | AIR |
| 3 | 14.745804 | 1.827869 | 4.200000 | CARBO |
| 4 | −24.372269 | 0.487309 | 4.500000 | AIR |
| 5 | −15.532049 | 0.750000 | 4.500000 | ACRYL |
| 6 | 13.574436 | 17.551292 | 4.500000 | AIR |
| AST | — | 1.116572 | 1.994652 AS | AIR |
| 8 | 10.368137 | 1.386226 | 3.060000 | ACRYL |
| 9 | −10.421617 | 1.014756 | 3.060000 | AIR |
| 10 | −6.995714 | 0.568144 | 2.430189 S | CARBO |
| 11 | 48.432378 | 0.300519 | 2.512951 S | AIR |
| 12 | 521.835363 | 2.052126 | 2.591488 S | FK5 |
| 13 | −5.755645 | 14.448033 | 2.948684 S | AIR |
| 14 | 38.446539 | 3.000000 | 3.081140 S | ACRYL |
| 15 | — | — | 3.025222 S | AIR |
| 16 | — | 0.300000 | 3.290549 | ACRYL |
| 17 | −11.423559 V | 12.300000 | 3.295927 | AIR |
| 18 | 4.247583 | 1.484954 | 2.500000 | ACRYL |
| 19 | −152.838630 | 5.015280 | 2.707004 | AIR |
| 20 | −6.130334 | 5.006760 | 2.600000 | ACRYL |
| 21 | −3.136582 | 2.493145 | 2.600000 | AIR |
| 22 | −2.133781 | 5.012447 | 1.800000 | ACRYL |
| 23 | −3.650089 | 20.996695 | 3.300000 | AIR |
| 24 | 16.350316 | 2.000000 | 5.200000 | LAK8 |
| 25 | −26.047378 | 12.453304 | 5.200000 | AIR |
| 26 | — | 6.900000 | 2.243330 | AIR |
| IMS | — | −0.118132 | 1.463466 S | |

*CONIC AND POLYNOMIAL ASPHERIC DATA

| SRF | CC | AD | AE | AF | AG |
|---|---|---|---|---|---|
| 3 | — | 0.001021 | −2.7053e−05 | 1.2836e−06 | −2.0541e−07 |
| 4 | — | 0.001539 | −9.3113e−05 | — | — |
| 5 | — | −0.001356 | 0.000154 | −4.7621e−06 | 1.4408e−07 |
| 6 | — | −0.003014 | 0.000269 | −1.0524e−05 | 1.3535e−07 |
| 8 | — | 7.3583e−05 | −5.8792e−06 | −5.0486e−07 | 2.3615e−07 |
| 9 | — | 0.002384 | 0.000112 | −1.1749e−05 | 8.4416e−07 |
| 10 | −1.000000 | 0.006391 | −0.000288 | −2.8344e−06 | 6.7653e−07 |
| 11 | — | 0.005022 | −0.000360 | 6.9595e−06 | 1.6356e−07 |
| 14 | — | −0.000665 | — | — | — |
| 17 | — | −0.000659 | 0.000174 | −1.9684e−05 | 7.6335e−07 |
| 18 | — | −0.001862 | −5.0340e−05 | −4.4058e−06 | −4.1117e−08 |
| 20 | — | −0.002623 | 0.001438 | −0.000267 | 2.8811e−05 |
| 21 | — | 0.006361 | 0.000352 | 3.7246e−05 | −7.4144e−09 |
| 22 | — | 0.011282 | 0.003690 | −0.001116 | 0.000290 |
| 23 | — | 0.000632 | 0.000227 | −1.9536e−05 | 1.8927e−06 |

*SYMMETRIC DIFFRACTIVE SURFACE 19
ORDER 1 WAVELENGTH 0.587560
KCO 1 DF1 −0.006734 DF2 0.000166 DF3 −1.5038e−05
*SURFACE 17 FRESNEL
*WAVELENGTHS: 0.587560 0.486130 0.656270
*REFRACTIVE INDICES

| SRF | GLASS | RN1 | RN2 | RN3 | VNBR |
|---|---|---|---|---|---|
| 1 | SK16 | 1.620410 | 1.627557 | 1.617272 | 60.322758 |
| 5 | ACRYL | 1.490082 | 1.496037 | 1.487570 | 57.880768 |
| 10 | CARBO | 1.585469 | 1.599220 | 1.579900 | 30.303790 |
| 12 | FK5 | 1.487490 | 1.492270 | 1.485346 | 70.404776 |
| 22 | ACRYL | 1.490082 | 1.496037 | 1.487570 | 57.880768 |
| 24 | LAK8 | 1.713003 | 1.722219 | 1.708974 | 53.830831 |

TABLE 4-continued

Field angle: 25.000000
Paraxial magnification: 0.569344
Entrance pupil radius: 0.800000
Exit pupil radius: 1.381868

TABLE 5

| SRF | RADIUS | THICKNESS | APERTURE RADIUS | GLASS |
|---|---|---|---|---|
| OBJECT | — | 1.0000e+20 | 5.5431e+19 | AIR |
| 1 | 10.689719 | 0.900000 | 5.500000 | SK16 |
| 2 | 4.693897 | 2.055421 | 4.200000 | AIR |
| 3 | 14.745804 | 1.827869 | 4.200000 | CARBO |
| 4 | −24.372269 | 0.487309 | 4.500000 | AIR |
| 5 | −15.532049 | 0.750000 | 4.500000 | ACRYL |
| 6 | 13.574436 | 17.551292 | 4.500000 | AIR |
| AST | — | 1.116572 | 1.994652 A | AIR |
| 8 | 10.368137 | 1.386226 | 3.060000 | ACRYL |
| 9 | −10.421617 | 1.014756 | 3.060000 | AIR |
| 10 | −6.995714 | 0.568144 | 2.531261 | CARBO |
| 11 | 48.432378 | 0.300519 | 2.627846 | AIR |
| 12 | 521.835363 | 2.052126 | 2.718393 | FK5 |
| 13 | −5.755645 | 16.494343 S | 3.130559 | AIR |
| 14 | — | 3.000000 | 3.290549 | ACRYL |
| 15 | −6.337163 V | 10.707424 | 3.295927 | AIR |
| 16 | −3.400997 | 3.402145 | 2.400000 | ACRYL |
| 17 | −3.539595 | 0.201806 | 2.400000 | AIR |
| 18 | 4.226012 | 2.576553 | 2.000000 | ACRYL |
| 19 | −8.232711 | 0.652067 | 2.000000 | AIR |
| 20 | −4.063785 | 1.516673 | 2.000000 | CARBO |
| 21 | 2.082673 | 0.521696 | 2.082673 | AIR |
| 22 | 4.277970 | 3.202030 | 2.454337 | ACRYL |
| 23 | −2.940192 | 10.001866 | 2.313577 | AIR |
| 24 | — | 6.900000 | 2.243330 | AIR |
| 25 | 5.783554 | 5.011609 | 5.783554 | ACRYL |
| 26 | −5.250328 | 0.107791 | 5.250328 | AIR |
| 27 | −5.541897 | 1.000000 | 5.261701 | CARBO |
| 28 | 7.740982 | 0.669468 | 5.300049 | AIR |
| 29 | 14.716287 | 4.504354 | 5.800000 | LAF2 |
| 30 | −11.834931 | 20.000000 | 5.500000 | AIR |
| EYE PUPIL | | 1.973467 | | |

*CONIC AND POLYNOMIAL ASPHERIC DATA

| SRF | CC | AD | AE | AF | AG |
|---|---|---|---|---|---|
| 3 | — | 0.001021 | −2.7053e−05 | 1.2836e−06 | −2.0541e−07 |
| 4 | — | 0.001539 | −9.3113e−05 | — | — |
| 5 | — | −0.001356 | 0.000154 | −4.7621e−06 | 1.4408e−07 |
| 6 | — | −0.003014 | 0.000269 | −1.0524e−05 | 1.3535e−07 |
| 8 | — | 7.3583e−05 | −5.8792e−06 | −5.0486e−07 | 2.3615e−07 |
| 9 | — | 0.002384 | 0.000112 | −1.1749e−05 | 8.4416e−07 |
| 10 | −1.000000 | 0.006391 | −0.000288 | −2.8344e−06 | 6.7653e−07 |
| 11 | — | 0.005022 | −0.000360 | 6.9595e−06 | 1.6356e−07 |
| 15 | — | −2.8758e−06 | 3.6838e−05 | −1.4736e−06 | 6.5227e−08 |
| 16 | — | 0.015996 | −0.003779 | 0.000582 | −2.9079e−05 |
| 17 | — | −0.001711 | 0.000486 | 1.4516e−05 | 2.1328e−07 |
| 18 | — | −0.012906 | 0.000732 | 8.7547e−05 | −3.9793e−06 |
| 19 | — | 0.005297 | 0.006673 | −0.002506 | 0.000277 |
| 20 | — | 0.045450 | −0.007495 | −0.001251 | 0.000309 |
| 21 | — | 0.012472 | −0.018717 | 0.002575 | 1.6538e−06 |
| 22 | — | −0.002554 | −0.001169 | −0.000138 | 0.000179 |
| 23 | — | 0.001370 | 0.000164 | −6.3613e−06 | 6.4374e−06 |
| 25 | −4.003457 | 0.001102 | −8.9627e−05 | −5.6729e−08 | 4.3170e−08 |
| 26 | −0.513660 | 0.000522 | 1.4429e−05 | 3.9193e−07 | −1.7412e−08 |
| 27 | — | 0.001298 | 6.2135e−05 | −3.1843e−08 | −1.5532e−08 |
| 28 | — | 0.000485 | −8.7264e−06 | −1.1485e−06 | 1.8220e−08 |

*SURFACE 15 FRESNEL
*WAVELENGTHS: 0.587560 0.486130 0.656270
*REFRACTIVE INDICES

| SRF | GLASS | RN1 | RN2 | RN3 | VNBR |
|---|---|---|---|---|---|
| 1 | SK16 | 1.620410 | 1.627557 | 1.617272 | 60.322758 |
| 12 | FK5 | 1.487490 | 1.492270 | 1.485346 | 70.404776 |

TABLE 5-continued

| 25 | ACRYL | 1.490082 | 1.496037 | 1.487570 | 57.880768 |
| 26 | CARBO | 1.585469 | 1.599220 | 1.579900 | 30.303790 |
| 29 | LAF2 | 1.744003 | 1.755685 | 1.739048 | 44.719264 |

FIELD ANGLE: 29.000000
PARAXIAL MAGNIFICATION: 0.394680
ENTRANCE PUPIL RADIUS: 0.800000
EXIT PUPIL RADIUS: 1.933268

TABLE 6

| SRF | RADIUS | THICKNESS | APERTURE RADIUS | GLASS |
|---|---|---|---|---|
| OBJECT | — | 9.0000e+19 | 4.7854e+10 | AIR |
| 1 | 26.544055 | 0.900000 | 5.700000 | SK16 |
| 2 | 5.460716 | 1.700000 | 4.900000 | AIR |
| 3 | 17.593077 | 2.300000 | 4.900000 | CARBO |
| 4 | −19.036559 | 1.00000 | 4.800000 | AIR |
| 5 | −6.046100 | 0.900000 | 4.500000 | ACRYL |
| 6 | −20.822267 | 15.026436 | 4.500000 | AIR |
| AST | — | 1.183557 | 2.840000 A | AIR |
| 8 | 8.799080 | 1.955184 | 3.700000 | BK7 |
| 9 | 256.496333 | 1.929345 | 3.500000 | AIR |
| 10 | −11.700290 | 0.736296 | 3.500000 | CARBO |
| 11 | 10.699288 | 0.280512 | 3.500000 | AIR |
| 12 | 8.786224 | 2.100000 | 3.500000 | ACRYL |
| 13 | −6.281592 | 9.057700 V | 3.500000 | AIR |
| 14 | 7.347991 | 4.000911 | 3.863875 | ARCYL |
| 15 | −5.747295 | 0.446894 | 3.051574 | AIR |
| 16 | −3.827891 | 1.447243 | 2.799437 | CARBO |
| 17 | −13.817083 | 0.999000 | 2.678703 | AIR |
| 18 | — | 12.490000 | 2.431900 | AIR |
| 19 | 3.511585 | 2.311483 | 2.860843 | ACRYL |
| 20 | −11.720395 | 0.100000 | 2.707004 | AIR |
| 21 | 119.755418 | 1.000000 | 2.046394 | O_S-TIH6 |
| 22 | 3.441730 | 1.860835 | 2.800000 | BK7 |
| 23 | 25.524272 | 4.138714 | 2.800000 | AIR |
| 24 | −6.491437 | 1.998800 | 2.600000 | ACRYL |
| 25 | −2.577963 | 2.667950 | 2.600000 | AIR |
| 26 | −2.000240 | 4.750643 | 1.800000 | ACRYL |
| 27 | −3.401540 | 20.910131 | 2.800000 | AIR |
| 28 | 19.187629 | 2.356339 | 5.200000 | LAK8 C |
| 29 | −18.940939 | 19.000000 | 5.200000 | AIR |
| EYE PUPIL | | 1.98 | | |

*CONIC AND POLYNOMIAL ASPHERIC DATA

| SRF | CC | AD | AE | AF | AG |
|---|---|---|---|---|---|
| 3 | — | 0.000419 | 2.3388e−05 | −6.3827e−07 | 5.2304e−08 |
| 4 | — | −0.000214 | 4.1433e−05 | −1.3688e−06 | 8.5189e−08 |
| 5 | — | 0.001265 | 1.0913e−05 | 1.4144e−07 | 1.3214e−08 |
| 6 | — | 0.000892 | −3.3345e−05 | 1.0561e−06 | −3.2621e−08 |
| 10 | — | −0.000973 | −4.3581e−05 | −3.7466e−07 | 1.9466e−07 |
| 11 | −1.000000 | −0.000564 | −6.2660e−05 | −1.4575e−06 | 1.9070e−07 |
| 12 | — | −0.000744 | −2.8429e−05 | −5.7369e−07 | 6.9789e−08 |
| 13 | — | 0.000151 | 6.0152e−06 | 1.5846e−06 | −3.2143e−08 |
| 14 | — | −0.001322 | 0.000116 | −3.2254e−05 | 1.4618e−06 |
| 15 | — | −0.022524 | 0.004583 | −0.000374 | 1.1885e−05 |
| 16 | — | −0.023803 | 0.007596 | −0.000696 | 2.5638e−05 |
| 17 | — | 0.000983 | 0.003449 | −0.001072 | 0.000108 |
| 19 | — | −0.003164 | −0.000108 | −3.4837e−05 | 2.0711e−06 |
| 20 | — | −1.4113e−06 | 1.1660e−06 | −3.0281e−05 | 4.0762e−06 |
| 24 | — | −0.013526 | −0.000760 | 5.0699e−05 | 5.3031e−05 |
| 25 | — | −0.001338 | 0.000892 | −2.7895e−05 | 3.0407e−05 |
| 26 | — | 0.000901 | 0.006055 | −0.001036 | 0.000419 |
| 27 | — | −0.000358 | 0.000479 | −4.1519e−05 | 4.1619e−06 |

*WAVELENGTHS: 0.546100   0.480000   0.643800
*REFRACTIVE INDICES

| SRF | GLASS | RN1 | RN2 | RN3 | VNBR |
|---|---|---|---|---|---|
| 1 | SK16 | 1.622861 | 1.628139 | 1.617774 | 60.091720 |
| 16 | CARBO | 1.590088 | 1.600365 | 1.580754 | 30.090095 |
| 21 | O_S-TIH6 | 1.812634 | 1.829735 | 1.797521 | 25.226476 |
| 22 | BK7 | 1.518721 | 1.522829 | 1.514721 | 63.978408 |

TABLE 6-continued

| 26 | ACRYL | 1.492067 | 1.496540 | 1.487978 | 57.474701 |
| 28 | LAK8 | 1.716158 | 1.722973 | 1.709618 | 53.624889 |

FIELD ANGLE: 28.000000
PARAXIAL MAGNIFICATIONS: 0.426819
ENTRANCE PUPIL RADIUS: 0.800000
EXIT PUPIL RADIUS: 1.982169

TABLE 7

| SRF | RADIUS | THICKNESS | APERTURE RADIUS | GLASS |
|---|---|---|---|---|
| OBJECT | — | 9.0000e+19 | 4.7854e+19 | AIR |
| 1 | 26.544055 | 0.900000 | 5.700000 | SK16 |
| 2 | 5.460716 | 1.700000 | 4.900000 | AIR |
| 3 | 17.593077 | 2.300000 | 4.900000 | CARBO |
| 4 | −19.036559 | 1.000000 | 4.800000 | AIR |
| 5 | −6.046100 | 0.900000 | 4.500000 | ACRYL |
| 6 | −20.822267 | 15.026436 | 4.500000 | AIR |
| AST | — | 1.183557 | 2.840000 | AIR |
| 8 | 8.799080 | 1.955184 | 3.700000 | BK7 |
| 9 | 256.496333 | 1.929345 | 3.500000 | AIR |
| 10 | −11.700290 | 0.736296 | 3.500000 | CARBO |
| 11 | 10.699288 | 0.280512 | 3.500000 | AIR |
| 12 | 8.786224 | 2.100000 | 3.500000 | ACRYL |
| 13 | −6.281592 | 16.658320 | 3.500000 | AIR |
| 14 | 3.893816 | 2.595243 | 3.700000 | CARBO |
| 15 | −18.282456 | 0.091460 | 3.700000 | AIR |
| 16 | 113.845821 | 0.493136 | 3.500000 | CARBO |
| 17 | 2.811686 | 1.920805 | 2.500000 | AIR |
| 18 | 2.966438 | 0.962640 | 2.800000 | ACRYL |
| 19 | 2.861156 | 9.017210 | 2.800000 | AIR |
| 20 | 3.511585 | 2.311483 | 2.860843 | ACRYL |
| 21 | −11.720395 | 0.100000 | 2.707004 | AIR |
| 22 | 119.755418 | 1.000000 | 2.046394 | O_S-TIH6 |
| 23 | 3.441730 | 1.860835 | 2.800000 | BK7 |
| 24 | 25.524272 | 4.138714 | 2.800000 | AIR |
| 25 | −6.491437 | 1.998800 | 2.600000 | ACRYL |
| 26 | −2.577963 | 2.667950 | 2.600000 | AIR |
| 27 | −2.000240 | 4.750643 | 1.800000 | ACRYL |
| 28 | −3.401540 | 20.910131 | 2.800000 | AIR |
| 29 | 19.187629 | 2.356339 | 5.200000 | LAK8 |
| 30 | −18.940939 | 19.000000 | 5.200000 | AIR |
| EYE PUPIL | | 2.307694 | | |

*CONIC AND POLYNOMIAL ASPHERIC DATA

| SRF | CC | AD | AE | AF | AG |
|---|---|---|---|---|---|
| 3 | — | 0.000419 | 2.3388e−05 | −6.3827e−07 | 5.2304e−08 |
| 4 | — | −0.000214 | 4.1433e−05 | −1.3688e−06 | 8.5189e−08 |
| 5 | — | 0.001265 | 1.0913e−05 | 1.4144e−07 | 1.3214e−08 |
| 6 | — | 0.000892 | −3.3345e−05 | 1.0561e−06 | −3.2621e−08 |
| 10 | — | −0.000973 | −4.3581e−05 | −3.7466e−07 | 1.9466e−07 |
| 11 | −1.000000 | −0.000564 | −6.2660e−05 | −1.4575e−06 | 1.9070e−07 |
| 12 | — | −0.000744 | −2.8429e−05 | −5.7369e−07 | 6.9789e−08 |
| 13 | — | 0.000151 | 6.0152e−06 | 1.5846e−06 | −3.2143e−08 |
| 14 | — | −0.017135 | −0.004037 | 0.000290 | −8.3632e−06 |
| 16 | — | 0.008190 | −0.001025 | 0.000156 | −7.7388e−06 |
| 18 | — | −0.012394 | −0.002934 | 0.000529 | −2.7068e−05 |
| 19 | — | −0.016422 | −0.002234 | 0.000507 | −3.5990e−05 |
| 20 | — | −0.003164 | −0.000108 | −3.4837e−05 | 2.0711e−06 |
| 21 | — | −1.4113e−06 | 1.1660e−06 | −3.0281e−05 | 4.0762e−06 |
| 25 | — | −0.013526 | −0.000760 | 5.0699e−05 | 5.3031e−05 |
| 26 | — | −0.001338 | 0.000892 | −2.7895e−05 | 3.0407e−05 |
| 27 | — | 0.000901 | 0.006055 | −0.001036 | 0.000419 |
| 28 | — | −0.000358 | 0.000479 | −4.1519e−05 | 4.1619e−06 |

*WAVELENGTHS: 0.546100   0.480000   0.643800
*REFRACTIVE INDICES

| SRF | GLASS | RN1 | RN2 | RN3 | VNBR |
|---|---|---|---|---|---|
| 1 | SK16 | 1.622861 | 1.628139 | 1.617774 | 60.091720 |
| 16 | CARBO | 1.590088 | 1.600365 | 1.580754 | 30.090095 |
| 22 | O_S-TIH6 | 1.812634 | 1.829735 | 1.797521 | 25.226476 |
| 23 | BK7 | 1.518721 | 1.522829 | 1.514721 | 63.978408 |

TABLE 7-continued

| | | | | | |
|---|---|---|---|---|---|
| 27 | ACRYL | 1.492067 | 1.496540 | 1.487978 | 57.474701 |
| 29 | LAK8 | 1.716158 | 1.722973 | 1.709618 | 53.624889 |
| 32 | IMAGE SURFACE | | | | |

| | |
|---|---|
| FIELD ANGLE: | 28.000000 |
| PARAXIAL MAGNIFICATIONS: | 0.428699 |
| ENTRANCE PUPIL RADIUS: | 0.800000 |
| EXIT PUPIL RADIUS: | 1.983656 |

TABLE 8

| SRF | RADIUS | THICKNESS | APERTURE RADIUS | GLASS |
|---|---|---|---|---|
| OBJECT | — | 1.0000e+20 | 5.0953e+10 | AIR |
| 1 | 21.428322 V | 0.900000 | 5.700000 | SK16 |
| 2 | 5.264807 V | 1.800000 | 4.600000 | AIR |
| 3 | 25.886340 V | 2.300000 | 4.800000 | CARBO |
| 4 | −13.147298 V | 0.900000 | 4.800000 | AIR |
| 5 | −5.586438 V | 0.900000 | 4.500000 | ACRYL |
| 6 | −21.017589 V | 14.716078 | 4.500000 | AIR |
| AST | — | 0.507589 V | 2.850000 | AIR |
| 8 | 8.797807 V | 1.685317 V | 3.664504 | BK7 |
| 9 | — | 2.806641 V | 2.383096 | AIR |
| 10 | −11.481770 V | 0.800000 | 3.500000 | CARBO |
| 11 | 9.519598 V | 0.294900 | 3.500000 | AIR |
| 12 | 7.892082 V | 2.400000 | 3.500000 | ACRYL |
| 13 | −6.194107 V | 10.500000 | 3.500000 | AIR |
| 14 | 4.683690 | 2.000000 | 3.500000 | ACRYL |
| 15 | −11.658735 | 0.098643 | 2.800000 | AIR |
| 16 | 13.470819 | 0.500000 | 2.716752 | SFL6 |
| 17 | 4.443796 | 2.123842 S | 2.869070 | AIR |
| 18 | — | 12.300000 | 2.341372 | AIR |
| 19 | 3.511585 | 2.311483 | 2.860843 | ACRYL |
| 20 | −11.720395 | 0.100000 | 2.707004 | AIR |
| 21 | 119.755418 | 1.000000 | 2.046394 | O_S-TIH6 |
| 22 | 3.441730 | 1.860835 | 2.800000 | BK7 |
| 23 | 25.524272 | 4.138714 | 2.800000 | AIR |
| 24 | −6.491437 | 1.998800 | 2.600000 | ACRYL |
| 25 | −2.577963 | 2.667953 | 2.600000 | AIR |
| 26 | −2.000240 | 4.750643 | 1.800000 | ACRYL |
| 27 | −3.401540 | 20.910131 | 2.800000 | AIR |
| 28 | 19.060000 | 2.356339 | 5.200000 | LAK8 |
| 29 | −19.060000 | 19.000000 | 5.200000 | AIR |
| EYE PUPIL | | | 2.281295 | |

*CONIC AND POLYNOMIAL ASPHERIC DATA

| SRF | CC | AD | AE | AF | AG |
|---|---|---|---|---|---|
| 3 | — | 0.000688 | 2.6056e−05 | −2.3540e−06 | 6.1824e−08 |
| 4 | — | 0.000418 | 5.7715e−05 | −5.2267e−06 | 1.1921e−07 |
| 5 | — | 0.001894 | 6.2928e−05 | −5.7992e−06 | 1.4496e−07 |
| 6 | — | 0.000768 | 1.3743e−06 | −1.8943e−06 | 2.1847e−08 |
| 10 | — | −0.001532 | 9.3532e−06 | −8.0189e−07 | 8.3468e−08 |
| 11 | −1.000000 | −0.001127 | −2.3637e−05 | 5.1934e−07 | 2.1492e−08 |
| 12 | — | −0.000926 | −2.9450e−05 | 7.5574e−07 | 1.4333e−09 |
| 13 | — | 0.000198 | 2.1728e−05 | −3.0731e−07 | 1.4342e−08 |
| 14 | 0.651558 | −0.002636 | 0.000595 | −8.0327e−05 | 3.1929e−06 |
| 15 | — | 0.002612 | 0.000407 | −8.8695e−05 | 5.3038e−06 |
| 19 | — | −0.003164 | −0.000108 | −3.4837e−05 | 2.0711e−06 |
| 20 | — | −1.4113e−06 | 1.1660e−06 | −3.0281e−05 | 4.0762e−06 |
| 24 | — | −0.013526 | −0.000760 | 5.0699e−05 | 5.3031e−05 |
| 25 | — | −0.001338 | 0.000892 | −2.7895e−05 | 3.0407e−05 |
| 26 | — | 0.000901 | 0.006055 | −0.001036 | 0.000419 |
| 27 | — | −0.000358 | 0.000479 | −4.1519e−05 | 4.1619e−06 |

*WAVELENGTHS: 0.546100  0.480000  0.643800
*REFRACTIVE INDICES

| SRF | GLASS | RN1 | RN2 | RN3 | VNBR |
|---|---|---|---|---|---|
| 1 | SK16 | 1.622861 | 1.628139 | 1.617774 | 60.091720 |
| 10 | CARBO | 1.590088 | 1.600365 | 1.580754 | 30.090095 |
| 16 | SFL6 | 1.812646 | 1.829763 | 1.797511 | 25.196668 |

TABLE 8-continued

| 21 | O_S-TIH6 | 1.812634 | 1.829735 | 1.797521 | 25.226476 |
|---|---|---|---|---|---|
| 22 | BK7 | 1.518721 | 1.522829 | 1.514721 | 63.978408 |
| 26 | ACRYL | 1.492067 | 1.496540 | 1.487978 | 57.474701 |
| 28 | LAK8 | 1.716158 | 1.722973 | 1.709618 | 53.624889 |

| | |
|---|---|
| ENTRANCE BEAM RADIUS: | 0.822000 |
| FIELD ANGLE: | 27.000000 |
| PARAXIAL MAGNIFICATION: | 0.443210 |
| ENTRANCE PUPIL RADIUS: | 0.822000 |
| EXIT PUPIL RADIUS: | 2.001542 |

TABLE 9

| SRF | RADIUS | THICKNESS | APERTURE RADIUS | GLASS |
|---|---|---|---|---|
| OBJECT | | 9.000e+19 | 4.9888e+19 | AIR |
| 1 | 20.718375 | 0.900000 | 5.500000 | SK16 |
| 2 | 5.180316 | 2.128085 | 4.200000 | AIR |
| 3 | 25.022120 | 1.698906 | 4.200000 | CARBO |
| 4 | −14.881814 | 0.745285 | 4.500000 | AIR |
| 5 | −8.047344 | 0.750000 | 4.500000 | ACRYL |
| 6 | −90.777547 | ZOOM SPACE | 4.500000 | AIR |
| AST | — | 0.099049 | 3.049317 | AIR |
| 8 | 7.269058 | 1.625025 | 3.060000 | ACRYL |
| 9 | −13.149202 | 1.055737 | 3.060000 | AIR |
| 10 | −6.482657 | 0.903827 | 3.136604 | CARBO |
| 11 | 55.611723 | 0.310774 | 3.280053 | AIR |
| 12 | 338.084521 | 2.001306 | 3.369299 | FK5 |
| 13 | −6.426239 | ZOOM SPACE | 3.748686 | AIR |
| 14 | 34.305559 | 3.000000 | 3.704695 | ACRYL |
| 15 | — | — | 3.592866 | AIR |
| IMAGE SURFACE | | | 3.591923 | |

*CONIC AND POLYNOMIAL ASPHERIC DATA

| SRF | CC | AD | AE | AF | AG |
|---|---|---|---|---|---|
| 3 | — | 0.000886 | 1.2326e−05 | 1.1968e−06 | −4.4145e−08 |
| 4 | — | 0.000724 | 2.0540e−05 | — | — |
| 5 | — | −2.0255e−05 | 3.7460e−05 | 3.0624e−07 | −1.2290e−08 |
| 6 | — | −0.000693 | 2.2323e−05 | 9.3019e−07 | −6.3603e−08 |
| 8 | — | 0.000381 | 6.6355e−05 | −8.8650e−07 | 5.2665e−07 |
| 9 | — | 0.002213 | 0.000183 | −1.2291e−05 | 9.4402e−07 |
| 10 | −1.000000 | 0.006257 | −0.000323 | −7.6830e−07 | 3.5456e−07 |
| 11 | — | 0.005164 | −0.000357 | 5.9860e−06 | 2.5789e−07 |
| 14 | — | −0.000679 | — | — | — |

*WAVELENGTHS: 0.546100  0.480000  0.643800
*REFRACTIVE INDICES

| GLASS | RN1 | RN2 | RN3 | VNBR |
|---|---|---|---|---|
| SK16 | 1.622861 | 1.628139 | 1.617774 | 60.091720 |
| CARBO | 1.590088 | 1.600365 | 1.580754 | 30.090095 |
| FK5 | 1.489142 | 1.492655 | 1.485692 | 70.244087 |
| ACRYL | 1.492067 | 1.496540 | 1.487978 | 57.474701 |

*ZOOM LENS DATA

| EFFECTIVE | | | FIELD |
|---|---|---|---|
| EF | f/# | H' | ANGLE |
| 6.4800 | 2.8929 | 3.5919 | 29.0000 |
| 11.7000 | 3.7742 | 3.5770 | 17.0000 |
| 18.0000 | 4.5000 | 3.6621 | 11.5000 |

*ZOOM LENS SPACINGS

| TH(6) | TH(13) |
|---|---|
| 17.7824 | 14.4697 |
| 7.2911 | 19.9486 |
| 2.7346 | 26.5739 |

TABLE 10

| SRF | RADIUS | THICKNESS | APERTURE RADIUS | GLASS |
|---|---|---|---|---|
| OBJECT | | 9.0000e+19 | 4.9888e+19 | AIR |
| 1 | 22.413395 | 0.900000 | 5.500000 | SK16 |
| 2 | 5.227829 | 2.095040 | 4.600000 | AIR |
| 3 | 19.014267 | 1.797981 | 4.500000 | CARBO |
| 4 | −18.648485 | 0.806985 | 4.500000 | AIR |
| 5 | −6.293434 | 0.750000 | 4.500000 | ACRYL |
| 6 | −21.265424 | ZOOM SPACE | 4.500000 | AIR |
| AST | — | 0.097960 | 3.105909 | AIR |
| 8 | 6.318702 | 2.048937 | 3.664504 | BK7 |
| 9 | 255.789301 | 0.799291 | 3.257731 | AIR |
| 10 | −83.171319 | 0.736296 | 3.196666 | CARBO |
| 11 | 6.161775 | 0.399470 | 3.117800 | AIR |
| 12 | 11.637225 | 1.450868 | 3.060000 | ACRYL |
| 13 | −7.981294 | ZOOM SPACE | 3.060000 | AIR |
| 14 | 26.292159 | 3.000000 | 3.728718 | ACRYL |
| 15 | — | −0.012726 | 3.595516 | AIR |
| IMAGE | | | 3.593669 | |

*CONIC AND POLYNOMIAL ASPHERIC DATA

| SRF | CC | AD | AE | AF | AG |
|---|---|---|---|---|---|
| 3 | — | 0.000525 | 5.2921e−06 | 6.4048e−07 | −1.2484e−08 |
| 4 | — | 8.2291e−05 | 2.2189e−05 | — | — |
| 5 | — | 0.001992 | −3.2276e−05 | 1.5702e−06 | −1.7914e−08 |
| 6 | — | 0.001371 | −7.1855e−05 | 2.7308e−06 | −6.9841e−08 |
| 10 | — | −0.004828 | 0.000431 | −1.8971e−05 | 3.5408e−07 |
| 11 | −1.000000 | −0.005244 | 0.000304 | −1.6356e−06 | −2.9487e−07 |
| 12 | — | −0.001425 | −0.000200 | 2.2988e−05 | −1.0207e−06 |
| 13 | — | −6.9382e−05 | 4.1678e−06 | −4.9882e−07 | −1.4936e−07 |
| 14 | — | −0.000931 | — | — | — |

*WAVELENGTHS: 0.546100  0.480000  0.643800
*REFRACTIVE INDICES

| GLASS | RN1 | RN2 | RN3 | VNBR |
|---|---|---|---|---|
| SK16 | 1.622861 | 1.628139 | 1.617774 | 60.091720 |
| BK7 | 1.518721 | 1.522829 | 1.514721 | 63.978408 |
| CARBO | 1.590088 | 1.600365 | 1.580754 | 30.090095 |
| ACRYL | 1.492067 | 1.496540 | 1.487978 | 57.474701 |

*ZOOM LENS DATA

| | IMAGE | INFINITY | | FIELD |
|---|---|---|---|---|
| EF | DISTANCE | f/# | H' | ANGLE |
| 6.4800 | −0.0065 | 2.8928 | 3.5926 | 29.0000 |
| 11.6999 | 0.0193 | 3.7742 | 3.5775 | 17.0000 |
| 17.9998 | −0.0038 | 4.4999 | 3.6624 | 11.5000 |

*ZOOM LENS SPACINGS
TH(6)   TH(13)

18.1208  14.4674
7.7999   20.0261
3.3243   26.7805

TABLE 11

| SRF | RADIUS | THICKNESS | APERTURE RADIUS | GLASS |
|---|---|---|---|---|
| OBJECT | | 9.0000e+19 | 5.1962e+19 c | AIR |
| 1 | 26.544055 | 0.900000 | 5.700000 | SK16 |
| 2 | 5.460716 | 1.700000 | 4.900000 | AIR |
| 3 | 17.593077 | 2.300000 | 4.900000 | CARBO |
| 4 | −19.036559 | 1.000000 | 4.800000 | AIR |
| 5 | −6.046100 | 0.900000 | 4.500000 | ACRYL |
| 6 | −20.822267 | ZOOM SPACE | 4.500000 | AIR |
| AST | — | 1.183557 | 2.840000 | AIR |
| 8 | 8.799080 | 1.955184 | 3.700000 | BK7 |
| 9 | 256.496333 | 1.929345 | 3.500000 | AIR |
| 10 | −11.700290 | 0.736296 | 3.500000 | CARBO |
| 11 | 10.699288 | 0.280512 | 3.500000 | AIR |
| 12 | 8.786224 | 2.100000 | 3.500000 | ACRYL |
| 13 | −6.281592 | ZOOM SPACE | 3.500000 | AIR |
| 14 | — | 1.000000 | 4.000000 | K5 |
| 15 | — | — | 4.000000 | AIR |
| 16 | 52.250817 | 0.700000 | 4.000000 | CARBO |
| 17 | — | — | 4.000000 | AIR |
| 18 | — | 0.550000 | 4.000000 | K5 |
| 19 | — | 1.011258 | 4.000000 | AIR |
| IMAGE SURFACE | | | 3.743359 | |

*CONIC AND POLYNOMIAL ASPHERIC DATA

| SRF | CC | AD | AE | AF | AG |
|---|---|---|---|---|---|
| 3 | — | 0.000419 | 2.3388e−05 | −6.3827e−07 | 5.2304e−08 |
| 4 | — | −0.000214 | 4.1433e−05 | −1.3688e−06 | 8.5189e−08 |
| 5 | — | 0.001265 | 1.0913e−05 | 1.4144e−07 | 1.3214e−08 |
| 6 | — | 0.000892 | −3.3345e−05 | 1.0561e−06 | −3.2621e−08 |
| 10 | — | −0.000973 | −4.3581e−05 | −3.7466e−06 | 1.9466e−07 |
| 11 | −1.000000 | −0.000564 | −6.2660e−05 | −1.4575e−06 | 1.9070e−07 |
| 12 | — | −0.000744 | −2.8429e−05 | −5.7369e−07 | 6.9789e−08 |
| 13 | — | 0.000151 | 6.0152e−06 | 1.5846e−06 | −3.2143e−08 |
| 16 | — | −0.000938 | −1.0709e−06 | — | — |

*WAVELENGTHS: 0.546100  0.4800000  0.634800
*REFRACTIVE INDICES

| GLASS | RN1 | RN2 | RN3 | VNBR |
|---|---|---|---|---|
| SK16 | 1.622861 | 1.628139 | 1.617774 | 60.091720 |
| ACRYL | 1.492067 | 1.496540 | 1.487978 | 57.474101 |
| CARBO | 1.590088 | 1.600365 | 1.580754 | 30.090095 |
| K5 | 1.524582 | 1.529098 | 1.520243 | 59.235528 |

*ZOOM LENS DATA

| | IMAGE | EFFECTIVE | | FIELD |
|---|---|---|---|---|
| EF | DISTANCE | f/# | H' | ANGLE |
| 6.4800 | 0.9837 | 2.8929 | 3.7386 | 30.0000 |
| 11.7000 | 0.9414 | 3.4821 | 3.5683 | 17.0000 |
| 18.0000 | 0.9171 | 4.1860 | 3.6541 | 11.5000 |

*ZOOM LENS SPACINGS
TH(6)   TH(13)

15.0264  14.3918
4.6830   19.9020
0.1952   26.6149

TABLE 12

| SRF | RADIUS | THICKNESS | APERTURE RADIUS | GLASS |
|---|---|---|---|---|
| OBJECT | SURFACE | 9.000e+19 | 5.1962e+19 | AIR |
| 1 | 21.428322 V | 0.900000 | 5.700000 | SK16 |
| 2 | 5.264807 V | 1.800000 | 4.600000 | AIR |
| 3 | 25.886340 V | 2.300000 | 4.800000 | CARBO |
| 4 | −13.147298 V | 0.900000 | 4.800000 | AIR |
| 5 | −5.586438 V | 0.900000 | 4.500000 | ACRYL |
| 6 | −21.017589 V | ZOOM SPACE | 4.500000 | AIR |
| AST | — | 0.507589 | 2.852062 | AIR |
| 8 | 8.797807 V | 1.685317 | 3.664504 | BK7 |
| 9 | — | 2.806641 | 3.174325 | AIR |
| 10 | −11.481770 V | 0.800000 | 3.500000 | CARBO |
| 11 | 9.519598 V | 0.294900 | 3.500000 | AIR |
| 12 | 7.892082 V | 2.400000 | 3.500000 | ACRYL |
| 13 | −6.194107 V | ZOOM SPACE | 3.500000 | AIR |
| 14 | 47.852306 V | 1.000000 | 3.909799 | CARBO |
| 15 | — | — | 3.857455 | AIR |
| 16 | — | 0.550000 | 3.857455 | K5 |
| 17 | — | ZOOM SPACE | 3.827430 | AIR |
| IMAGE | | | 3.742263 | |

*CONIC AND POLYNOMIAL ASPHERIC DATA

TABLE 12-continued

| SRF | CC | AD | AE | AF | AG |
|---|---|---|---|---|---|
| 3 | — | 0.000688 | 2.6056e-05 | -2.3540e-06 | 6.1824e-08 |
| 4 | — | 0.000418 | 5.7715e-05 | -5.2267e-06 | 1.1921e-07 |
| 5 | — | 0.001894 | 6.2928e-05 | -5.7992e-06 | 1.4496e-07 |
| 6 | — | 0.000768 | 1.3743e-06 | -1.8943e-06 | 2.1847e-08 |
| 10 | — | -0.001532 | 9.3532e-06 | -8.0189e-07 | 8.3468e-08 |
| 11 | -1.000000 | -0.001127 | -2.3637e-05 | 5.1934e-07 | 2.1492e-08 |
| 12 | — | -0.000926 | -2.9450e-05 | 7.5574e-07 | 1.4333e-08 |
| 13 | — | 0.000198 | 2.1728e-05 | -3.0731e-07 | 1.4342e-08 |
| 14 | — | -0.001195 | 5.0738e-05 | -1.5837e-06 | — |

*WAVELENGTHS:    0.546100    0.480000    0.643800
*REFRACTIVE INDICES

| GLASS | RN1 | RN2 | RN3 | VNBR |
|---|---|---|---|---|
| SK16 | 1.622861 | 1.628139 | 1.617774 | 60.091720 |
| BK7 | 1.518721 | 1.522829 | 1.514721 | 63.978408 |
| ACRYL | 1.492067 | 1.496540 | 1.487978 | 57.474701 |
| CARBO | 1.590088 | 1.600365 | 1.580754 | 30.090095 |
| K5 | 1.524582 | 1.529098 | 1.520243 | 59.235528 |

*ZOOM LENS DATA

| EF | IMAGE DISTANCE | EFFECTIVE f/# | H' | FIELD ANGLE |
|---|---|---|---|---|
| 6.4800 | 1.0233 | 2.8928 | 3.7401 | 30.0000 |
| 11.6999 | 0.9926 | 3.7742 | 3.5722 | 17.0000 |
| 17.9998 | 0.9162 | 4.4999 | 3.6549 | 11.5000 |

*ZOOM LENS SPACINGS

| TH(6) | TH(13) | TH(17) |
|---|---|---|
| 14.7161 | 14.4079 | 1.0360 |
| 4.5903 | 20.1265 | 1.0687 |
| 0.1946 | 27.0647 | 1.0707 |

TABLE 13

| SRF | RADIUS | THICKNESS | APERTURE RADIUS | GLASS |
|---|---|---|---|---|
| OBJ | — | 9.0000e+10 | 5.0593+19 | AIR |
| 1 | 23.079700 | 0.900000 | 5.350000 K | SK16 |
| 2 | 5.281015 | 1.800000 | 4.600000 | AIR |
| 3 | 15.070017 V | 2.300000 | 4.800000 | CARBO |
| 4 | -43.686384 V | 0.900000 | 4.800000 | AIR |
| 5 | -9.701923 V | 0.900000 | 4.500000 | H_FC5 |
| 6 | -138.786507 V | 13.645600 | 4.500000 | AIR |
| AST | — | 0.811253 | 2.336054 AS | AIR |
| 8 | 8.584438 | 1.696788 | 3.664504 | BK7 |
| 9 | 176.445600 | 2.805600 | 3.500000 | AIR |
| 10 | -9.582165 V | 0.800000 | 3.500000 | H_E-FD15 |
| 11 | 17.478984 V | 0.307650 | 3.500000 | AIR |
| 12 | 7.684152 V | 2.400000 | 3.500000 | ACRYL |
| 13 | -6.297309 V | 15.025672 V | 2.950000 K | AIR |
| 14 | 47.852306 | 1.000000 | 4.100000 K | CARBO |
| 15 | — | — | 3.866150 S | AIR |
| 16 | — | 0.550000 | 3.866150 S | K5 |
| 17 | — | 1.035979 S | 3.845063 S | AIR |
| IMS | — | -0.032200 | 3.786391 S | |

*CONIC AND POLYNOMIAL ASPHERIC DATA

| SRF | CC | AD | AE | AF | AG |
|---|---|---|---|---|---|
| 3 | — | 0.000241 | -2.7449e-06 | 1.4345e-07 | 1.4680e-08 |
| 4 | — | -0.000359 | -1.5485e-05 | 8.8996e-07 | -2.6341e-08 |
| 12 | — | -0.000739 | -9.4986e-05 | 9.3341e-06 | -1.4616e-07 |
| 13 | — | 0.000576 | -7.4944e-06 | -2.5618e-06 | 3.4164e-07 |
| 14 | — | -0.003952 | 0.000526 | -3.4852e-05 | 8.4331e-07 |

WAVELENGTHS:    0.546100    0.480000    0.643800
*REFRACTIVE INDICES

TABLE 13-continued

| GLASS | RN1 | RN2 | RN3 | VNBR |
|---|---|---|---|---|
| SK16 | 1.622861 | 1.628139 | 1.617774 | 60.091720 |
| H_FC5 | 1.489140 | 1.492657 | 1.485695 | 70.260911 |
| BK7 | 1.518721 | 1.522829 | 1.514721 | 63.978408 |
| H_E-FD15 | 1.704439 | 1.716887 | 1.693266 | 29.821928 |
| ACRYL | 1.492067 | 1.496540 | 1.487978 | 57.474701 |
| CARBO | 1.590088 | 1.600365 | 1.580754 | 30.090095 |
| K5 | 1.524582 | 1.529098 | 1.520243 | 59.235528 |

*ZOOM LENS DATA

| EF | IMAGE DISTANCE | EFFECTIVE f/# | H' | FIELD ANGLE |
|---|---|---|---|---|
| 6.7323 | 1.0038 | 3.5433 | 3.7818 | 29.3423 |
| 11.6993 | 1.0511 | 4.1783 | 3.5721 | 17.0000 |
| 18.0250 | 0.9101 | 5.0069 | 3.6603 | 11.5000 |

*ZOOM LENS SPACINGS

| TH(6) | TH(13) | TH(17) | TH(18) |
|---|---|---|---|
| 13.6456 | 15.0257 | 1.0360 | -0.0322 |
| 4.4686 | 20.5176 | 1.1311 | -0.0800 |
| 0.1220 | 27.6764 | 1.0701 | -0.1600 |

What is claimed is:

1. An optical system which can be switched between a first optical path, a second optical path, and a third optical path, said system comprising:
   (A) an objective lens unit having a positive optical power;
   (B) an erector lens unit having a positive optical power;
   (C) an eye lens unit having a positive optical power;
   (D) a sensor unit;
   (E) a display unit; and
   (F) optical means for switching the optical system between said first, second, and thrid optical paths; wherein
   (i) the first optical path comprises, in order, the objective lens unit, the erector lens unit, and the eye lens unit;
   (ii) the second optical path comprises, in order, the display unit and the eye lens unit; and
   (iii) the tird optical path comorises, in order, the objective lens unit and the sensor unit.

2. An optical system which can be switched between a first optical path, a second optical path, said system comprising:
   (A) an objective lens unit having a positive optical power;
   (B) an erector lens unit having a positive optical power;
   (C) an eye lens unit having a positive optical power;
   (D) a display unit; and
   (E) optical means for switching the optical system between the first and second optical paths; wherein:
   (i) the first optical path comprises, in order, the objective lens unit, the erector lens unit, and the eye lens unit; and
   (ii) the second optical path comprises, in order, the display unit and the eye lens unit.

3. An optical system which can be switched between a first optical path and a third optical path, said system comprising:
   (A) an objective lens unit having a positive optical power;
   (B) an erector lens unit having a positive optical power;
   (C) an eye lens unit having a positive optical power;

(D) a sensor unit; and
(E) optical means for switching the optical system between said first and third optical paths;
wherein:
(i) the first optical path comprises, in order, the objective lens unit, the erector lens unit, and the eye lens unit; and
(ii) the third optical path comprises, in order, the objective lens unit and the sensor unit.

4. The optical system of claim 1, 2, or 3 wherein the first optical path lies in a single plane.

5. The optical system of claim 1 or 2 wherein the first and second optical paths lie in a single plane.

6. The optical system of claim 1 or 3 wherein the first optical path and a first portion of the third optical path lies in a single plane and a second portion of the third optical path is orthogonal to the single plane.

7. An optical system which has a first optical path which defines an optical axis, said optical system comprising in order:
(A) an objective lens unit having a positive optical power;
(B) an erector lens unit having a positive optical power; and
(C) an eye lens unit having a positive optical power;
wherein:
(i) the optical axis lies in a plane and has first and second folds which define a first optical axis portion, a second optical axis portion, and a third optical axis portion;
(ii) the first and third optical axis portions are parallel but not collinear;
(iii) the second optical axis portion is perpendicular to the first and the third optical axis portions, with the first optical axis portion extended in one direction from the second optical axis portion and the third optical axis portion extended in the opposite direction from the second optical axis portion; and
(iv) the optical axis of the objective first lens unit is collinear with the first optical axis portion, the optical axis of the erector lens unit is collinear with the second optical axis portion, and the optical axis of the eye lens unit is collinear with the third optical axis portion.

8. The optical system of claim 7 wherein:
(a) the length of the first optical axis portion between the object end of the objective first lens unit and the first fold is $L_1$, the length of the second optical axis portion between the two folds is $L_2$, and the length of the third optical axis portion between the second fold and the image end of the eye lens unit is $L_3$; and
(b) $1.25(L_1+L_3) \geq L_2 \geq 0.75(L_1+L_3)$.

9. The optical system of claim 8 wherein:

$$1.15(L_1+L_3) \geq L_2 \geq 0.85(L_1+L_3).$$

10. The optical system of claim 8 wherein: $L_2 \leq 10$ cm.

11. The optical system of claim 8 wherein: $L_2 \leq 8$ cm.

12. The optical system of claim 1, 2, 3, or 7 wherein the positive optical power of the objective lens unit can be varied.

13. The optical system of claim 12 wherein the positive optical power of the objective lens unit can be varied over a range such that the ratio of the strongest optical power to the weakest optical power is approximately 3:1.

14. The optical system of claim 12 wherein the objective lens unit has:
(a) a wide angle focal length $f_{MIN}$;
(b) a long conjugate and a short conjugate; and
(c) an exit pupil distance $D_{EP}$ in short conjugate space; where:

$$|D_{EP}/f_{MIN}| \geq 2.0.$$

15. The optical system of claim 14 wherein:

$$|D_{EP}/f_{MIN}| \geq 2.5.$$

16. The optical system of claim 12 wherein the objective lens unit has:
(a) a wide angle focal length $f_{MIN}$;
(b) a long conjugate and a short conjugate; and
(c) a back focal length $D_{BF}$ in short conjugate space; where:

$$D_{BF}/f_{MIN} \geq 1.0.$$

17. The optical system of claim 16 wherein:

$$D_{BF}/f_{MIN} \geq 1.5.$$

18. The optical system of claim 12 wherein the objective lens unit has a long conjugate and a short conjugate and wherein, in order from said long conjugate to said short conjugate, said unit comprises:
(a) a first lens unit having a focal length $f_1$; and
(b) a second lens unit that moves to effect a change in the optical power of the objective lens unit, said second lens unit having a focal length $f_2$;
wherein:

$f_1 < 0$, and $f_2 > 0$.

19. The optical system of claim 18 wherein:

$$|f_1|/f_2 < 1.$$

20. The optical system of claim 18 wherein:

$$|(|f_2|-|f_1|)|/|f_2| \leq 0.2.$$

21. The optical system of claim 20 wherein:

$$|(|f_2|-|f_1|)|/|f_2| \leq 0.1.$$

22. The optical system of claim 18 wherein:
(a) the first lens unit comprises two lens elements, each of which has two aspherical surfaces; and
(b) the second lens unit comprises two lens elements, each of which has two aspherical surfaces.

23. The optical system of claim 18 wherein the first lens unit moves for compensating or focusing or both compensating and focusing.

24. The optical system of claim 18 wherein the objective lens unit comprises an aperture stop which is located between the first and second lens units, said aperture stop being closer to the second lens unit than to the first lens unit.

25. The optical system of claim 18 wherein, in order from said long conjugate to said short conjugate, the first lens unit consists of a negative lens element, a positive lens element, and a negative lens element.

26. The optical system of claim 1 or 2 wherein the second optical path comprises the erector lens unit between the display unit and the eye lens unit.

27. The optical system of claim 1, 2, 3, or 7 wherein the erector lens unit comprises a diffractive surface which provides correction of chromatic aberrations.

28. The optical system of claim 1, 2, 3, or 7 wherein the erector lens unit comprises a positive surface at both its image and object sides and a negative internal surface.

29. The optical system of claim 1, 2, 3, or 7 further comprising an image size adjusting lens unit located in the first optical path between the objective lens unit and the erector lens unit.

30. The optical system of claim 29 wherein:
  (a) the objective lens unit forms an intermediate image in the first optical path between the objective lens unit and the erector lens unit;
  (b) the image size adjusting lens unit is located between the objective lens unit and the intermediate image; and
  (c) the image size adjusting lens unit has a positive optical power;
    whereby the image size adjusting lens unit reduces the size of the intermediate image.

31. The optical system of claim 29 wherein the image size adjusting lens unit comprises at least one positive lens element and at least one negative lens element.

32. The optical system of claim 1, 2, 3, or 7 wherein:
  (a) the objective lens unit forms an intermediate image in the first optical path; and
  (b) the system comprises a field stop in the first optical path substantially at the location of the intermediate image.

33. The optical system of claim 1, 2, 3, or 7 wherein the eye lens unit consists of a single lens element.

34. The optical system of claim 1, 2, 3, or 7 wherein the eye lens unit has a focal length which is greater than 10 millimeters and less than 15 millimeters.

35. The optical system of claim 1 or 3 wherein:
  (a) the system further comprises a sensor lens unit; and
  (b) the third optical path comprises said sensor lens unit between said objective lens unit and said sensor unit.

36. The optical system of claim 35 wherein the sensor lens unit reduces the sensitivity of the system to manufacturing variations.

37. The optical system of claim 35 wherein the sensor lens unit consists of a positive lens element.

38. The optical system of claim 1 wherein the optical means for switching comprises:
  (a) a first moveable mirror having a home position and a moved position, said mirror directing light from the objective lens unit towards the erector lens unit when in its home position and allowing light to pass from the objective lens unit towards the sensor unit when in its moved position; and
  (b) a second moveable mirror having a home position and a moved position, said mirror allowing light to pass from the first moveable mirror towards the erector lens unit when in its home position and directing light from the display unit towards the erector unit when in its moved position; wherein:
    (1) the first and second moveable mirrors are in their home positions when the system is switched to the first optical path;
    (2) the first moveable mirror is in its moved position when the system is switched to the third optical path; and
    (3) the second moveable mirror is in its moved position when the system is switched to the second optical path.

39. The optical system of claim 38 wherein the system further comprises:
  (a) a first fixed mirror for directing light from the objective lens unit towards the sensor unit when the system is switched to the third optical path; and
  (b) a second fixed mirror for directing light from the erector lens unit towards the eye lens unit when the system is switched to the first or second optical paths.

40. The optical system of claim 39 wherein:
  (a) the first moveable mirror comprises means for allowing light to reach the sensor unit when the first moveable mirror is in its home position at a level sufficient to permit auto-focusing; and
  (b) first fixed mirror is a cold mirror.

41. An optical system comprising:
  (A) a zoom lens which has a long conjugate and a short conjugate and, in order from said long conjugate to said short conjugate, comprises:
    (i) a first lens unit having a focal length $f_1$, said first lens unit comprising two lens elements, each of which has two aspherical surfaces;
    (ii) a second lens unit that moves to effect a change in the optical power of the zoom lens, said second lens unit having a focal length $f_2$ and comprising two lens elements, each of which has two aspherical surfaces; and
    (iii) a third lens unit; and
  (B) a sensor unit adjacent to the third lens unit.

42. The optical system of claim 41 wherein the first lens unit moves for compensating or focusing or both compensating and focusing.

43. The optical system of claim 41 wherein the zoom lens comprises an aperture stop which is located between the first and second lens units, said aperture stop being closer to the second lens unit than to the first lens unit.

44. The optical system of claim 41 wherein, in order from said long conjugate to said short conjugate, the first lens unit consists of a negative lens element, a positive lens element, and a negative lens element.

45. The optical system of claim 41 wherein the zoom lens has:
  (a) a wide angle focal length $f_{MIN}$; and
  (b) an exit pupil distance $D_{EP}$ in short conjugate space;
    where:

$|D_{EP}|/f_{MIN} \geq 2.0$.

46. The optical system of claim 45 wherein:

$|D_{EP}|/f_{MIN} \geq 2.5$.

47. The optical system of claim 41 wherein:
  (a) the zoom lens unit has a wide angle focal length $f_{MIN}$; and
  (b) the first and second lens units have a back focal length $D_{BF}$ in short conjugate space;
    where:

$D_{BF}/f_{MIN} \geq 1.0$.

48. The optical system of claim 47 wherein:

$D_{BF}/f_{MIN} \geq 1.5$.

49. The optical system of claim 41 wherein:

$f_1 < 0$, and $f_2 > 0$.

50. The optical system of claim 41 wherein:

$|f_1|/f_2 < 1$.

51. The optical system of claim 41 wherein:

$|(|f_2|-|f_1|)|/|f_2| \leq 0.2$.

52. The optical system of claim 51 wherein:

$|(|f_2|-|f_1|)|/|f_2| \leq 0.1$.

53. A zoom lens which has a long conjugate and a short conjugate and, in order from said long conjugate to said short conjugate, comprises:
   (a) a first lens unit having a focal length $f_1$, said first lens unit comprising two lens elements, each of which has two aspherical surfaces; and
   (b) a second lens unit that moves to effect a change in the optical power of the zoom lens, said second lens unit having a focal length $f_2$ and comprising two lens elements, each of which has two aspherical surfaces;
   wherein:

$f_1 < 0$, $f_2 > 0$, and $|f_1|/f_2 < 1$.

54. The zoom lens of claim 53 wherein the first lens unit moves for compensating or focusing or both compensating and focusing.

55. The zoom lens of claim 53 wherein the lens comprises an aperture stop which is located between the first and second lens units, said aperture stop being closer to the second lens unit than to the first lens unit.

56. The zoom lens of claim 53 wherein, in order from said long conjugate to said short conjugate, the first lens unit consists of a negative lens element, a positive lens element, and a negative lens element.

57. The zoom lens of claim 53 wherein the lens has:
   (a) a wide angle focal length $f_{MIN}$; and
   (b) an exit pupil distance $D_{EP}$ in short conjugate space;
   where:

$|D_{EP}|/f_{MIN} \geq 2.0$.

58. The zoom lens of claim 57 wherein:

$|D_{EP}|/f_{MIN} \geq 2.5$.

59. The zoom lens of claim 53 wherein the lens has:
   (a) a wide angle focal length $f_{MIN}$; and
   (b) a back focal length $D_{BF}$ in short conjugate space;
   where:

$|D_{BF}|/f_{MIN} \geq 1.0$.

60. The zoom lens of claim 59 wherein:

$D_{BF}/f_{MIN} \geq 1.5$.

61. The zoom lens of claim 53 wherein:

$|(|f_2|-|f_1|)|/|f_2| \leq 0.2$.

62. The zoom lens of claim 61 wherein:

$|(|f_2|-|f_1|)|/|f_2| \leq 0.1$.

63. An optical system comprising:
   (A) a zoom lens which has a long conjugate and a short conjugate, a wide angle focal length $f_{MIN}$, and, in order from said long conjugate to said short conjugate, comprises: p2 (i) a first lens unit having a focal length $f_1$;
      (ii) a second lens unit that moves to effect a change in the optical power of the zoom lens, said second lens unit having a focal length $f_2$; and
      (iii) a third lens unit which comprises at least one aspheric surface; and
   (B) a sensor unit adjacent to the third lens unit;
   wherein:

$f_1 < 0$;

$f_2 > 0$; and $D_{BF}/f_{MIN} \geq 1.0$;

where $D_{BF}$ is the back focal length of said first and second lens units in short conjugate space.

64. The optical system of claim 63 wherein the first lens unit moves for compensating or focusing or both compensating and focusing.

65. The optical system of claim 63 wherein the zoom lens comprises an aperture stop which is located between the first and second lens units, said aperture stop being closer to the second lens unit than to the first lens unit.

66. The optical system of claim 63 wherein:

$D_{BF}/f_{MIN} \geq 1.5$.

67. The optical system of claim 63 wherein the zoom lens has an exit pupil distance $D_{EP}$ in short conjugate space and wherein:

$|D_{EP}|/f_{MIN} \geq 2.0$.

68. The optical system of claim 67 wherein:

$|D_{EP}|/f_{MIN} \geq 2.5$.

69. The optical system of claim 63 wherein:

$|f_1|/f_2 < 1$.

70. The optical system of claim 63 wherein:

$|(|f_2|-|f_1|)|/|f_2| \leq 0.2$.

71. The optical system of claim 70 wherein:

$|(|f_2|-|f_1|)|/|f_2| \leq 0.1$.

72. An optical system comprising:
   (A) a zoom lens which has a long conjugate and a short conjugate and, in order from said long conjugate to said short conjugate, comprises:
      (i) a first lens unit having a focal length $f_1$, said first lens unit comprising two lens elements, each of which has two aspherical surfaces;
      (ii) a second lens unit that moves to effect a change in the optical power of the zoom lens, said second lens unit having a focal length $f_2$ and comprising two lens elements, each of which has two aspherical surfaces; and
      (iii) a third lens unit; and (B) a sensor unit adjacent to the third lens unit;
wherein the third lens unit consists of a positive lens element.

73. An optical system comprising:
(A) a zoom lens which has a long conjugate and a short conjugate, a wide angle focal length $f_{MIN}$, and, in order from said long conjugate to said short conjugate, comprises:
   (i) a first lens unit having a focal length $f_1$;
   (ii) a second lens unit that moves to effect a change in the optical power of the zoom lens, said second lens unit having a focal length $f_2$; and
   (iii) a third lens unit which comprises at least one aspheric surface; and
(B) a sensor unit adjacent to the third lens unit;
wherein:

$f_1 < 0$;

$f_2 > 0$; and $D_{BF}/f_{MIN} \geq 1.0$;

where $D_{BF}$ is the back focal length of said first and second lens units in short conjugate space;
and wherein the third lens unit consists of a positive lens element.

* * * * *